(12) United States Patent
Huskinson et al.

(10) Patent No.: US 9,966,622 B2
(45) Date of Patent: May 8, 2018

(54) SMALL ORGANIC MOLECULE BASED FLOW BATTERY

(71) Applicant: President and Fellows of Harvard College, Cambridge, MA (US)

(72) Inventors: Brian Huskinson, Flower Mound, TX (US); Michael Marshak, Cambridge, MA (US); Michael J. Aziz, Concord, MA (US); Roy G. Gordon, Cambridge, MA (US); Theodore A. Betley, Cambridge, MA (US); Alan Aspuru-Guzik, Cambridge, MA (US); Suleyman Er, Katwijk (NL); Changwon Suh, Centreville, VA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days. days.

(21) Appl. No.: 14/823,546

(22) Filed: Aug. 11, 2015

(65) Prior Publication Data
US 2016/0043423 A1  Feb. 11, 2016

Related U.S. Application Data

(63) Continuation of application No. 14/431,175, filed as application No. PCT/US2013/062057 on Sep. 26, 2013.
(Continued)

(51) Int. Cl.
*H01M 8/18* (2006.01)
*H01M 8/08* (2016.01)
(Continued)

(52) U.S. Cl.
CPC ............ *H01M 8/083* (2013.01); *H01M 4/60* (2013.01); *H01M 4/9008* (2013.01);
(Continued)

(58) Field of Classification Search
CPC ............................................. H01M 8/18–8/20
See application file for complete search history.

(56) References Cited

U.S. PATENT DOCUMENTS 3,238,066 A    3/1966   Klass et al.
3,288,641 A    11/1966  Rightmire
(Continued)

FOREIGN PATENT DOCUMENTS

JP    S62-73577 A    4/1987
JP    H04019966 A    1/1992
(Continued)

OTHER PUBLICATIONS

Partial Supplementary European Search Report for European Application No. 13841221.8, dated Jun. 30, 2016 (8 pages).
(Continued)

*Primary Examiner* — Jonathan Crepeau
*Assistant Examiner* — Jacob Buchanan
(74) *Attorney, Agent, or Firm* — Clark & Elbing LLP

(57) ABSTRACT

The invention provides an electrochemical cell based on a new chemistry for a flow battery for large scale, e.g., gridscale, electrical energy storage. Electrical energy is stored chemically at an electrochemical electrode by the protonation of small organic molecules called quinones to hydroquinones. The proton is provided by a complementary electrochemical reaction at the other electrode. These reactions are reversed to deliver electrical energy. A flow battery based on this concept can operate as a closed system. The flow battery architecture has scaling advantages over solid electrode batteries for large scale energy storage.

16 Claims, 19 Drawing Sheets

Related U.S. Application Data

(60) Provisional application No. 61/838,589, filed on Jun. 24, 2013, provisional application No. 61/823,258, filed on May 14, 2013, provisional application No. 61/705,845, filed on Sep. 26, 2012.

(51) Int. Cl.

| | | |
|---|---|---|
| *H01M 8/083* | (2016.01) | |
| *H01M 4/60* | (2006.01) | |
| *H01M 8/20* | (2006.01) | |
| *H01M 4/90* | (2006.01) | |
| *H01M 8/04186* | (2016.01) | |
| *H01M 8/04082* | (2016.01) | |

(52) U.S. Cl.
CPC ....... *H01M 8/04186* (2013.01); *H01M 8/188* (2013.01); *H01M 8/20* (2013.01); *H01M 8/04201* (2013.01); *H01M 2300/0014* (2013.01); *Y02E 60/528* (2013.01)

(56) References Cited

U.S. PATENT DOCUMENTS

| | | | |
|---|---|---|---|
| 4,578,323 A | 3/1986 | Hertl et al. | |
| 4,711,828 A | 12/1987 | Ishida et al. | |
| 6,033,784 A | 3/2000 | Jacobsen et al. | |
| 2002/0088576 A1 | 7/2002 | Andoh et al. | |
| 2007/0134520 A1 | 6/2007 | Shimomura et al. | |
| 2007/0184309 A1* | 8/2007 | Gust, Jr. ................ | C12P 3/00 429/2 |
| 2009/0017379 A1* | 1/2009 | Inatomi ............... | B60L 11/1816 429/213 |
| 2009/0094822 A1* | 4/2009 | Ohtsuka ............ | H01M 10/0427 29/623.1 |
| 2011/0027624 A1* | 2/2011 | Deane .................... | H01M 4/13 429/49 |
| 2011/0223450 A1* | 9/2011 | Horne ................. | B60L 11/1824 429/72 |
| 2011/0284456 A1 | 11/2011 | Brozell | |
| 2014/0370403 A1 | 12/2014 | Narayan et al. | |
| 2015/0079497 A1 | 3/2015 | Lavastre et al. | |
| 2015/0243991 A1* | 8/2015 | Huskinson ........ | H01M 8/04186 429/72 |
| 2016/0248114 A1* | 8/2016 | Huskinson ............ | H01M 8/188 |

FOREIGN PATENT DOCUMENTS

| | | | |
|---|---|---|---|
| JP | H08185868 A | 7/1996 | |
| JP | 2002-100398 A | 4/2002 | |
| WO | WO-2006/129635 A1 | 12/2006 | |
| WO | WO 2011/131959 * | 10/2011 | .............. H01M 8/18 |
| WO | WO-2011/131959 A1 | 10/2011 | |
| WO | WO-2015/048550 A1 | 4/2015 | |
| WO | WO-2016/144909 A1 | 9/2016 | |

OTHER PUBLICATIONS

Weber et al., "Redox flow batteries: a review," J Appl Electrochem 41:1137-64 (2011).
Xu et al., "A study of tiron in aqueous solutions for redox flow battery application," Electrochimica Acta 715-20 (2010).
Extended European Search Report for European Application No. 13841221.8, dated Oct. 7, 2016 (13 pages).
U.S. Appl. No. 14/823,546, filed Aug. 11, 2015, Huskinson et al.
Alt et al., "Evaluation of organic battery electrodes: voltammetric study of the redox behaviour of solid quinones," J. Appl. Electrochem. 2(3):193-200 (1972).
Borisova et al., "Simple Preparative Synthesis of Spinochrome E, a Pigment from Sea Urchins of the Genus *Echinothrix*," Chem Nat Comp. 48(2):202-4 (2012).
Chen et al., "A quinone-bromide flow battery with 1 W/cm2 power density," author manuscript, published in final form as: J Electrochem Soc. 163(1):A5010-3 (2016) (9 pages).
Conant et al., "Free and total energy changes in the reduction of quinones," J Am Chem Soc. 44(11):2480-93 (1922).
Conant et al., "Reduction potentials of quinones. I. The effect of the solvent on the potentials of certain benzoquinones," J Am Chem Soc. 45(9):2194-218 (1923).
Conant et al., "Reduction potentials of quinones. II. The potentials of certain derivatives of benzoquinone, naphthoquinone and anthraquinone," J Am Chem Soc. 46(8):1858-1881 (1924).
Diaz, "Analytical applications of 1,10-anthraquinones: A review," Talanta. 38(6):571-88 (1991).
Er et al., "Computational design of molecules for an all-quinone redox flow battery," Chem Sci. 6(2):885-93 (2015).
Hori, Electrochemical CO2 reduction on metal electrodes. *Modern aspects of electrochemistry.* C. Vayenas et al., 89-189 (2008).
Hull et al., "Reversible hydrogen storage using CO2 and a proton-switchable iridium catalyst in aqueous media under mild temperatures and pressures," Nat Chem. 4(5):383-8 (2012).
Huskinson et al., "A metal-free organic-inorganic aqueous flow battery," Nature. 505(7482):195-8 (2014) (16 pages).
Huskinson et al., "Cycling of a quinone-bromide flow battery for large-scale electrochemical energy storage," author manuscript, published in final form as: ECS Trans. 61(37):27-30 (2014) (4 pages).
Huskinson et al., "Novel quinone-based couples for flow batteries," author manuscript, published in final form as: ECS Trans. 53(7):101-5 (2013) (5 pages).
International Search Report and Written Opinion for International Application No. PCT/US2013/062057, dated Mar. 6, 2014 (16 pages).
Li et al., "CO2 reduction at low overpotential on Cu electrodes resulting from the reduction of thick Cu2O films," J Am Chem Soc. 134(17):7231-4 (2012).
Lin et al., "Alkaline quinone flow battery," Science. 349(6255):1529-32 (2015) (27 pages).
Nawar et al., "Benzoquinone-hydroquinone couple for flow battery," author manuscript, published in final form as: MRS Proceedings. 1491:mrsf12-1491 (2013) (6 pages).
Rasmussen, "A single substance organic redox flow battery," ESS, 2012 (Poster presentation).
Wang et al., "Anthraquinone with tailored structure for a nonaqueous metal-organic redox flow battery," Chem Commun (Camb). 48(53):6669-71 (2012).
Xu et al., "Novel organic redox flow batteries using soluble quinonoid compounds as positive materials," IEEE. (4 pages) (2009).
Yao et al., "High-capacity organic positive-electrode material based on a benzoquinone derivative for use in rechargeable lithium batteries," J Power Sources. 195(24): 8336-40 (2010).

\* cited by examiner

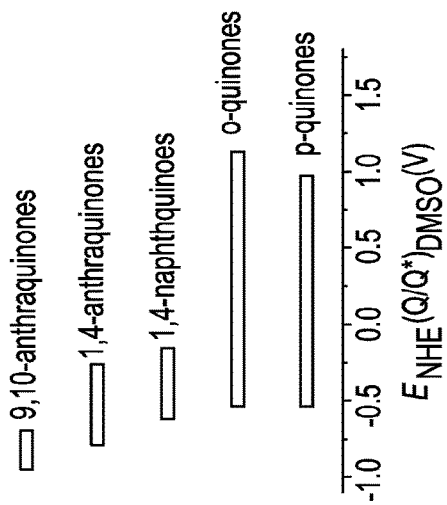

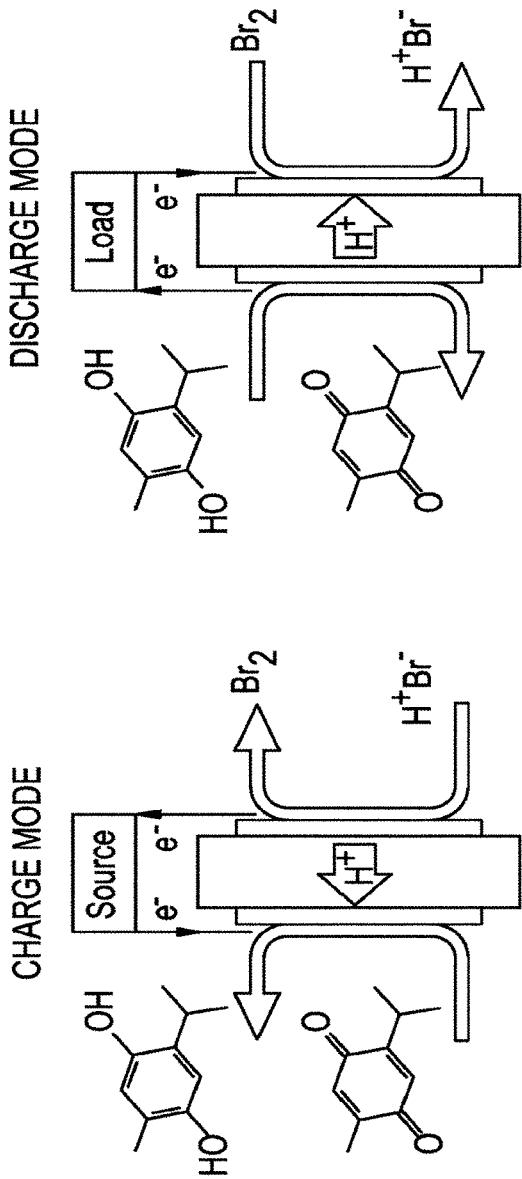

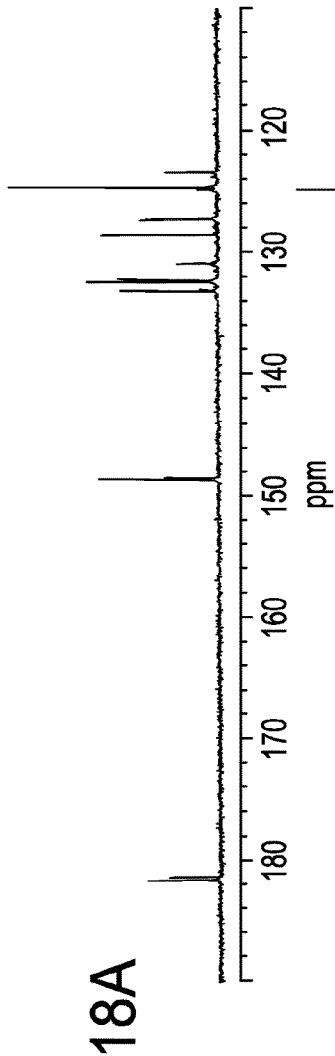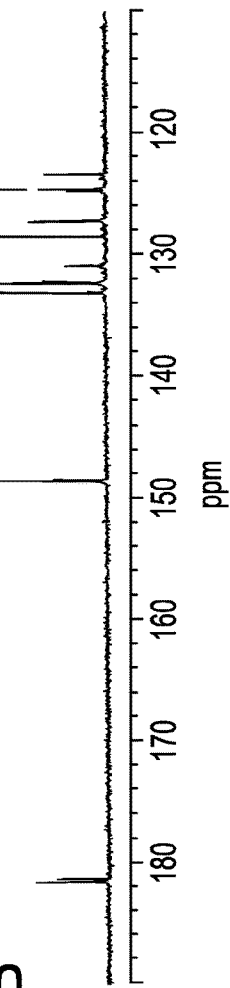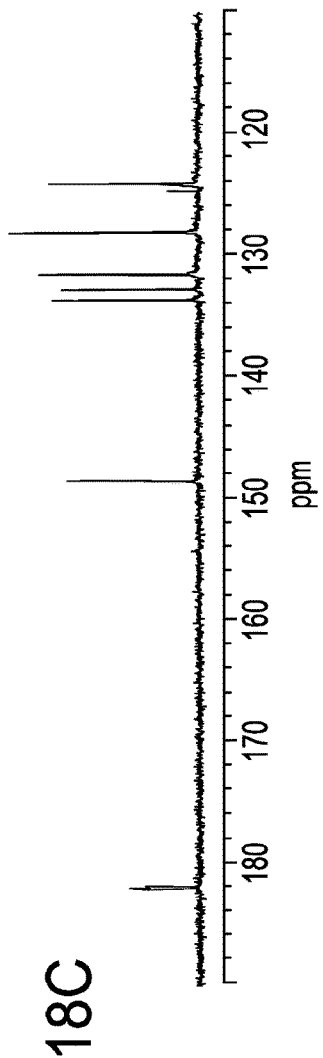
FIG. 18A
FIG. 18B
FIG. 18C

SMALL ORGANIC MOLECULE BASED FLOW BATTERY

STATEMENT REGARDING FEDERALLY SPONSORED RESEARCH

This invention was made with government support under grant number DE-AR0000348 from the Advanced Research Projects Agency—Energy—U.S. Department of Energy. The government has certain rights to the invention.

BACKGROUND OF THE INVENTION

Intermittent renewable electrical power sources such as wind and photovoltaics (PV) cannot replace a significant fraction of our current fossil fuel-based electrical generation unless the intermittency problem is solved. Fluctuations in renewable source power are generally backed up by natural gas fired "peaker" plants. Inexpensive, reliable energy storage at or near the generation site could render the renewable source dispatchable (e.g. demand-following) and permit the gas peakers to replace baseload coal. It could also permit full utilization of the transmission capacity of power lines from the generation site, permitting supply capacity expansion while deferring the need for transmission capacity expansion.

The advantages of flow batteries are giving them increased attention for grid-scale electrical storage [1]: because all of the reactants and products are stored in tanks outside the electrochemical conversion device, the device itself may be optimized for the required power while the required energy is independently determined by the mass of reactant and the size of storage tanks. This can drive down the storage cost per kWh, which is the single most challenging requirement for grid-scale storage. In contrast, in solid electrode batteries the energy/power ratio (i.e. the peak-power discharge time) does not scale and is inadequate for rendering intermittent renewable power sources dispatchable. Most solid-electrode batteries have peak-power discharge times <<1 hr., whereas rendering PV and wind dispatchable require ~15 and ~50 hrs., respectively [2].

The commonly recognized technology options for grid-scale electrical energy storage are summarized in Table 1. Commercial activity with zinc-bromine hybrid flow batteries illustrates the technical feasibility of liquid bromine and hydrobromic acid as reactants. However, by its nature the design—involving Zn plating within the electrochemical conversion device—does not permit flow battery-like energy scaling; it also presents a dendrite-shorting risk [1]. Arguably the most developed flow battery technologies are vanadium redox flow batteries (VRBs) and sodium-sulfur batteries (NaSBs). Costs per kW are comparable, whereas VRBs are considerably more costly on a cost per kWh basis, in part due to the high price of vanadium, which sets a floor on the ultimate cost per kWh of a VRB [3]. The vanadium itself costs around $160/kWh based on recent costs for $V_2O_5$ [4]. VRBs do benefit from a longer cycle life, with the ability to be cycled in excess of 10,000 times, whereas NaSBs are typically limited to about 4,500 cycles [3]. For VRBs, costs per kW are likely to move lower, as recent improvements in VRB cell design have led to significantly higher power densities and current densities, with values of 0.55 $W/cm^2$ and 0.9 $A/cm^2$, respectively [5], but these don't help lower the ultimate floor on the cost per kWh. These values, to our knowledge, represent the best performance achieved in VRBs reported to date in the literature. NaSBs have to operate above 300° C. to keep the reactants molten, which sets a floor on their operating costs. Over 100 MW of NaSBs have been installed on the grid in Japan, but this is due to government fiat rather than market forces. NaSBs have the longest duration (energy/power) at ~7 hrs. VRBs are the subject of aggressive development, whereas NaSBs represent a static target. There is also recent work on the regenerative electrolysis of hydrohalic acid to dihalogen and dihydrogen [6-9], where the halogen is chlorine or bromine. These systems have the potential for lower storage cost per kWh than VRBs due to the lower cost of the chemical reactants.

TABLE 1

Energy Storage for the grid. From Dunn et al. [3]; origional source EPRI.

| Technology option | Maturity | Capacity (MWh) | Power (MW) | Duration (hours) | % Efficiency (total cycles) | Total Cost ($/kW) | Cost ($/kWh) |
|---|---|---|---|---|---|---|---|
| CAES (above ground) | Demo | 250 | 50 | 5 | (>10,000) | 1950-2150 | 390-430 |
| Advanced Pb-acid | Demo | 3.2-48 | 1-12 | 3.2-4 | 75-90 (4500) | 2000-4600 | 625-1150 |
| Na/S | Commercial | 7.2 | 1 | 7.2 | 75 (4500) | 3200-4000 | 445-555 |
| Zn/Br flow | Demo | 5-50 | 1-10 | 5 | 60-65 (>10,000) | 1670-2015 | 340-1350 |
| V redox | Demo | 4-40 | 1-10 | 4 | 65-70 (>10,000) | 3000-3310 | 750-830 |
| Fe/Cr flow | R&D | 4 | 1 | 4 | 75 (>10,000) | 1200-1600 | 300-400 |
| Zn/air | R&D | 5.4 | 1 | 5.4 | 75 (4500) | 1750-1900 | 325-350 |
| Li-ion | Demo | 4-24 | 1-10 | 2-4 | 90-94 (4500) | 1800-4100 | 900-1700 |

SUMMARY OF THE INVENTION

The invention provides an electrochemical cell based on a new chemistry for a flow battery for large scale, e.g., gridscale, electrical energy storage. Electrical energy is stored chemically at an electrochemical electrode by the protonation of small organic molecules called quinones to hydroquinones. The proton is provided by a complementary electrochemical reaction at the other electrode. These reactions are reversed to deliver electrical energy. A flow battery based on this concept can operate as a closed system. The flow battery architecture has scaling advantages over solid electrode batteries for large scale energy storage. Because quinone-to-hydroquinone cycling occurs rapidly and reversibly in photosynthesis, we expect to be able to employ it to obtain high current density, high efficiency, and long lifetime in a flow battery. High current density drives down power-related costs. The other advantages this particular technology would have over other flow batteries include inexpensive chemicals, energy storage in the form of safer liquids, an inexpensive separator, little or no precious metals usage in the electrodes, and other components made of plastic or inexpensive metals with coatings proven to afford corrosion protection.

Variations of a quinone-based cell are described. One is a quinone/hydroquinone couple as the negative electrode against a positive electrode with a redox active species. In one embodiment, the positive electrode and the negative electrode are quinone/hydroquinone couples.

In one aspect, the invention provides a rechargeable battery having first and second electrodes, wherein in its charged state, the battery includes a redox active species in contact with the first electrode and a hydroquinone dissolved or suspended in aqueous solution in contact with the second electrode, wherein during discharge the redox active species is reduced and the hydroquinone is oxidized to a quinone. In certain embodiments, the redox active species is dissolved or suspended in aqueous solution. Redox active species may include chlorine, bromine, iodine, oxygen, vanadium, chromium, cobalt, iron, manganese, cobalt, nickel, copper, or lead, in particular, bromine or a manganese oxide, a cobalt oxide or a lead oxide. Alternatively, the redox active species is a second quinone dissolved or suspended in aqueous solution, as described herein. In a specific embodiment, the hydroquinone and quinone, e.g., a water-soluble anthraquinone optionally including one or more sulfonate groups, have a standard electrochemical potential below 0.4 volts with respect to a standard hydrogen electrode. Typically, the first electrode is separated from the second electrode by a barrier that inhibits the passage of the redox-active species and the hydroquinone, e.g., an ion conducting membrane or a size exclusion membrane. In a specific embodiment, the first and second electrodes are separated by an ion conducting barrier, and the redox active species includes bromine.

In another aspect, the invention features a rechargeable battery including first and second electrodes separated by an ion conducting hydrocarbon barrier or size-exclusion barrier, wherein in its charged state, the battery includes a quinone at the first electrode and a hydroquinone at the second electrode, wherein during discharge, the quinone is reduced, and the hydroquinone is oxidized.

In a related aspect the invention features a rechargeable battery including first and second electrodes separated by an ion conducting barrier, wherein in its charged state, the battery includes a quinone in aqueous solution at the first electrode and a hydroquinone in aqueous solution at the second electrode, wherein during discharge, the quinone is reduced, and the hydroquinone is oxidized. In a further related aspect, the invention features a rechargeable battery including first and second electrodes separated by an ion conducting barrier, wherein in its charged state, the battery includes bromine at the first electrode and a hydroquinone at the second electrode, wherein during discharge, bromine is reduced, and the hydroquinone is oxidized. In yet a further aspect, the invention features a rechargeable battery including first and second electrodes separated by an ion conducting hydrocarbon barrier, wherein in its charged state, the battery includes a quinone at the first electrode and a hydroquinone at the second electrode, wherein during discharge, the quinone is reduced, and the hydroquinone is oxidized. For any of these aspects, the quinone or hydroquinone in oxidized form is, for example, of formula (I) or (II):

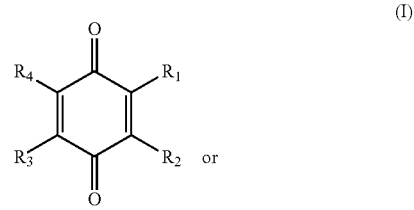

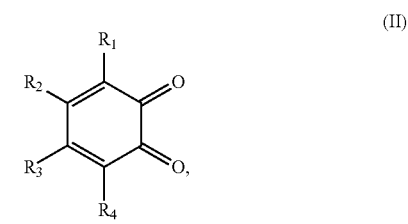

wherein each of $R_1$-$R_4$ is independently selected from H, $C_{1-6}$ alkyl, halo, hydroxy, $C_{1-6}$ alkoxy, and $SO_3H$, or an ion thereof, e.g., H, $C_{1-6}$ alkyl, halo, $C_{1-6}$ alkoxy, and $SO_3H$, or an ion thereof or H, $C_{1-6}$ alkyl, $C_{1-6}$ alkoxy, and $SO_3H$, or an ion thereof. In another embodiment, the quinone or hydroquinone in oxidized form is, for example, of formula (III):

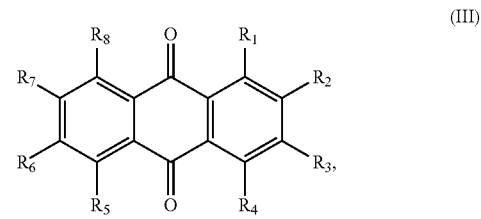

wherein each of $R_1$-$R_8$ is independently selected from H, $C_{1-6}$ alkyl, halo, hydroxyl, $C_{1-6}$ alkoxy, and $SO_3H$, or an ion thereof, e.g., H, $C_{1-6}$ alkyl, halo, $C_{1-6}$ alkoxy, and $SO_3H$, or an ion thereof, or H, $C_{1-6}$ alkyl, $C_{1-6}$ alkoxy, and $SO_3H$, or an ion thereof.

A rechargeable battery of the invention may further include a reservoir for quinone and/or hydroquinone dissolved or suspended in aqueous solution and a mechanism to circulate quinone and/or hydroquinone. In particular embodiments, the rechargeable battery is a flow battery.

Exemplary quinones or hydroquinones in oxidized form are of formula (A)-(D):

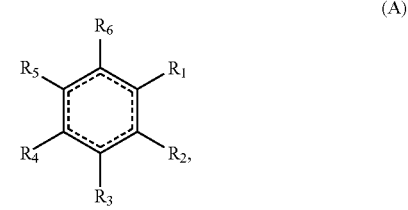

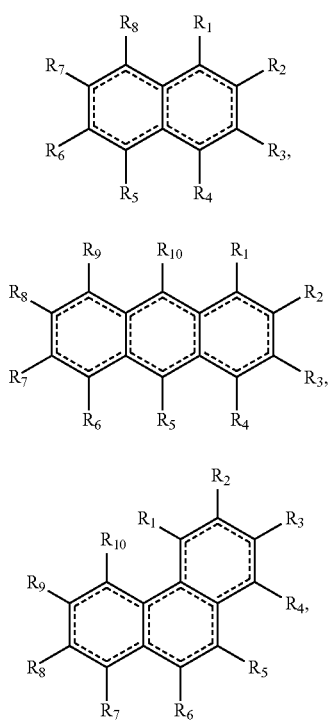

wherein each of $R_1$-$R_{10}$ is independently selected from H, optionally substituted $C_{1-6}$ alkyl, halo, hydroxy, optionally substituted $C_{1-6}$ alkoxy, $SO_3H$, amino, nitro, carboxyl, phosphoryl, phosphonyl, and oxo, or an ion thereof, provided that two of $R_1$-$R_6$ for formula (A) are oxo, two or four of $R_1$-$R_8$ for formula (B) are oxo, and two, four, or six of $R_1$-$R_{10}$ for formulas (C) and (D) are oxo, wherein the dashed lines indicate that the monocylic ring of formula (A), the bicyclic ring of formula (B), and the tricyclic rings of formulas (C) and (D) are fully conjugated. In specific embodiments, $R_1$-$R_{10}$ is independently selected from H, optionally substituted $C_{1-6}$ alkyl, hydroxy, optionally substituted $C_{1-6}$ alkoxy, $SO_3H$, amino, nitro, carboxyl, phosphoryl, phosphonyl, and oxo, or an ion thereof.

Exemplary quinones or hydroquinones in oxidized form may also be of formula (I)-(IX):

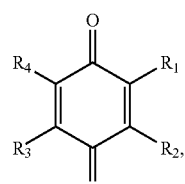

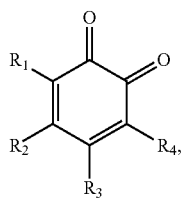

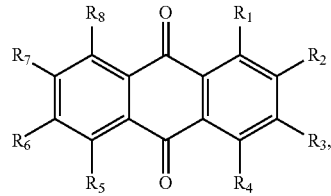

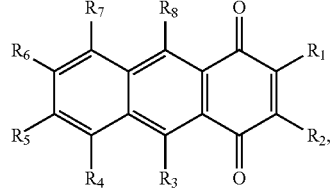

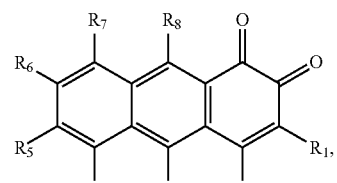

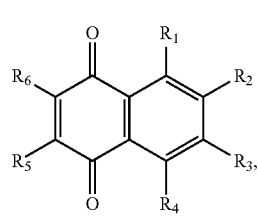

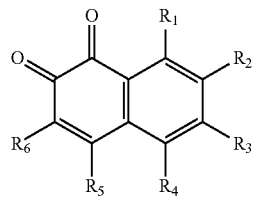

wherein each of $R_1$-$R_8$ is independently selected from H, optionally substituted $C_{1-6}$ alkyl, halo, hydroxy, optionally substituted $C_{1-6}$ alkoxy, $SO_3H$, amino, nitro, carboxyl, phosphoryl, phosphonyl, and oxo, or an ion thereof. In particular embodiments, each of $R_1$-$R_8$ is independently selected from H, optionally substituted $C_{1-6}$ alkyl, hydroxy, optionally substituted $C_{1-6}$ alkoxy, $SO_3H$, amino, nitro, carboxyl, phosphoryl, phosphonyl, and oxo, or an ion thereof.

Specific quinones or hydroquinones in oxidized form for use with any aspect of the invention include 9,10-anthraquinone-2,7-disulfonic acid, 9,10-anthraquinone-2,6-disulfonic acid, 9,10-anthraquinone-1,8-disulfonic acid, 9,10-anthraquinone-1,5-disulfonic acid, 9,10-anthraquinone-2-sulfonic acid, 9,10-anthraquinone-2,3-dimethanesulfonic acid, 1,8-dihydroxy-9,10-anthraquinone-2,7-disulfonic acid, 1,5-dihydroxy-9,10-anthraquinone-2,6-disulfonic acid, 1,4-dihydroxy-9,10-anthraquinone-2-sulfonic acid, 1,3,4-trihydroxy-9,10-anthraquinone-2-sulfonic acid, 1,2-naphthoquinone-4-sulfonic acid, 1,4-naphthoquinone-2-sulfonic acid, 2-chloro-1,4-naphthoquinone-3-sulfonic acid, 2-bromo-1,4-naphthoquinone-3-sulfonic acid, or a mixture thereof. Further preferred quinones or hydroquinones in oxidized form include 9,10-anthraquinone-2,7-disulfonic acid, 9,10-anthraquinone-2,6-disulfonic acid, 9,10-anthraquinone-1,8-disulfonic acid, 9,10-anthraquinone-1,5-disulfonic acid, 9,10-anthraquinone-2-sulfonic acid, or a mixture thereof. An exemplary quinone for use with any aspect of the invention is 9,10-anthraquinone-2,7-disulfonate.

Additional quinones or hydroquinones in oxidized form include 2-hydroxy-1,4-naphthoquinone-3-sulfonic acid, 1,2,4-trihydroxybenzene-3-sulfonic acid, 2,4,5-trihydroxybenzene-1,3-disulfonic acid 2,3,5-trihydroxybenzene-1,4-disulfonic acid, 2,4,5,6-tetrahydroxybenzene-1,3-disulfonic acid, 2,3,5-trihydroxybenzene-1,4-disulfonic acid, 2,3,5,6-tetrahydroxybenzene-1,4-disulfonic acid, or a mixture thereof.

Still further quinones and hydroquinones in oxidized form for use alone or in mixtures in any aspect of the invention are described herein, e.g., in Table 4.

The invention also provides methods for storing electrical energy by applying a voltage across the first and second electrodes and charging any battery of the invention.

The invention also provides methods for providing electrical energy by connecting a load to the first and second electrodes and allowing any battery of the invention to discharge.

In certain embodiments, 4,5-dihydroxy-1,3-benzenedisulfonate and/or 2,5-dihydroxy-benzenedisulfonate are specifically excluded as the hydroquinone or quinone in reduced form for any aspect of the invention.

The absence of active metal components in both redox chemistry and catalysis represents a significant shift away from modern batteries. In particular, the use of quinones, such as 9,10-anthraquinone-2,7-disulfonate, offers several advantages over current flow battery technologies:

(1) Scalability: it contains the earth-abundant atoms, such as carbon, sulfur, hydrogen and oxygen, and can be inexpensively manufactured on large scales. Because some quinones are natural products, there is also the possibility that the electrolyte material can be renewably sourced.

(2) Kinetics: it undergoes rapid two-electron redox on simple carbon electrodes and does not require a costly precious metal catalyst.

(3) Stability: the quinone should exhibit minimal membrane crossover because of its relatively large size and potential for a dianionic state. Furthermore, although bromine crossover is a known issue in zinc-bromine and hydrogen-bromine cells, 9,10-anthraquinone-2,7-disulfonate is stable to prolonged heating in concentrated $Br_2$/HBr mixtures.

(4) Solubility: it has a solubility of order 1 M at pH 0 and can be stored at relatively high energy densities.

(5) Tunability: The reduction potential and solubility of quinones can be further optimized by introduction of electron-donating functional groups such as —OH.

These features lower the capital cost of storage chemicals per kWh, which sets a floor on the ultimate system cost per kWh at any scale. Sulfonated anthraquinones are used on an industrial scale in wood pulp processing for paper, and they can be readily synthesized from the commodity chemicals anthraquinone and oleum. We estimate chemical costs of $21 kWh$^{-1}$ for 9,10-anthraquinone-2,7-disulfonate and $6 kWh$^{-1}$ for bromine. A quinone-bromine flow battery offers significant cost improvements to vanadium flow batteries that cost $81 kWh$^{-1}$. Optimization of engineering and operating parameters such as the flow field geometry, electrode design, membrane separator, and temperature should lead to significant performance improvements in the future, as it has for vanadium flow batteries, which took many years to surpass 100 mW cm$^{-2}$. The use of quinones represents a new and promising direction for cost-effective, large-scale energy storage.

For the purposes of this invention, the term "quinone" includes a compound having one or more conjugated, $C_{3-10}$ carbocyclic, fused rings, substituted, in oxidized form, with two or more oxo groups, which are in conjugation with the one or more conjugated rings. Preferably, the number of rings is from one to ten, e.g., one, two, or three, and each ring has 6 members.

By alkyl is meant straight chain or branched saturated groups from 1 to 6 carbons. Alkyl groups are exemplified by methyl, ethyl, n- and iso-propyl, n-, sec-, iso- and tert-butyl, neopentyl, and the like, and may be optionally substituted with one, two, three, or, in the case of alkyl groups of two carbons or more, four substituents independently selected from the group consisting of halo, hydroxyl, $C_{1-6}$ alkoxy, $SO_3H$, amino, nitro, carboxyl, phosphoryl, phosphonyl, and oxo, or an ion thereof.

By "alkoxy" is meant a group of formula —OR, wherein R is an alkyl group, as defined herein.

By "halo" is meant, fluoro, chloro, bromo, or iodo.

By "hydroxyl" is meant —OH.

By "amino" is meant —$NH_2$. An exemplary ion of amino is —$NH_3^+$.

By "nitro" is meant —$NO_2$.

By "carboxyl" is meant —COOH. An exemplary ion of carboxyl, is —COO$^-$.

By "sulfonyl" is meant —$SO_3H$. An exemplary ion of sulfonyl is —$SO_3^-$.

By "phosphoryl" is meant —$PO_3H_2$. Exemplary ions of phosphoryl are —$PO_3H^-$ and —$PO_3^{2-}$.

By "phosphonyl" is meant —$PO_3R_2$, wherein each R is independent H or alkyl, as defined herein. An exemplary ion of phosphoryl is —$PO_3R^-$.

By "oxo" is meant =O.

BRIEF DESCRIPTION OF THE DRAWINGS

FIGS. 1A-1B are schemes of redox potentials of interest. FIG. 1A: Range of redox potentials spanning roughly 2V in dimethyl sulfoxide exhibited by quinones from [10]. FIG. 1B: Range of aqueous standard reduction potentials vs. SHE (pH 0).

FIGS. 2A-2B are schemes of a battery having a hydroquinone at the negative electrode and bromine at the positive electrode. FIG. 2A: charge mode; FIG. 2B: discharge mode.

FIG. 3A: 1 m catechol in 1 N $H_2SO_4$. The plot shows the oxidative current density vs. voltage of a 0.149 cm$^2$ working electrode of flat Pt. FIG. 3B: 3.9 m catechol in 1 N $H_2SO_4$ reached 370 mA/cm$^2$ with no sign of peaking.

FIG. 18A is $^{13}$C NMR (500 MHz, D$_2$O) spectrum of AQDS. $\delta$=181.50 (C 9), 181.30 (C 10), 148.51 (C 2,7), 133.16 (C 11), 132.40 (C 12), 130.86 (C 3,6), 128.59 (C 4,5), 124.72 ppm (C 1,8).

FIG. 18B is $^{13}$C NMR (500 MHz, D$_2$O) spectrum of the same sample, 24 h after addition of Br$_2$.

FIG. 18C is $^{13}$C NMR spectrum of AQDS treated with 2 M HBr and Br$_2$ and heated to 100° C. for 48 h.

DETAILED DESCRIPTION OF THE INVENTION

Figure 3A:
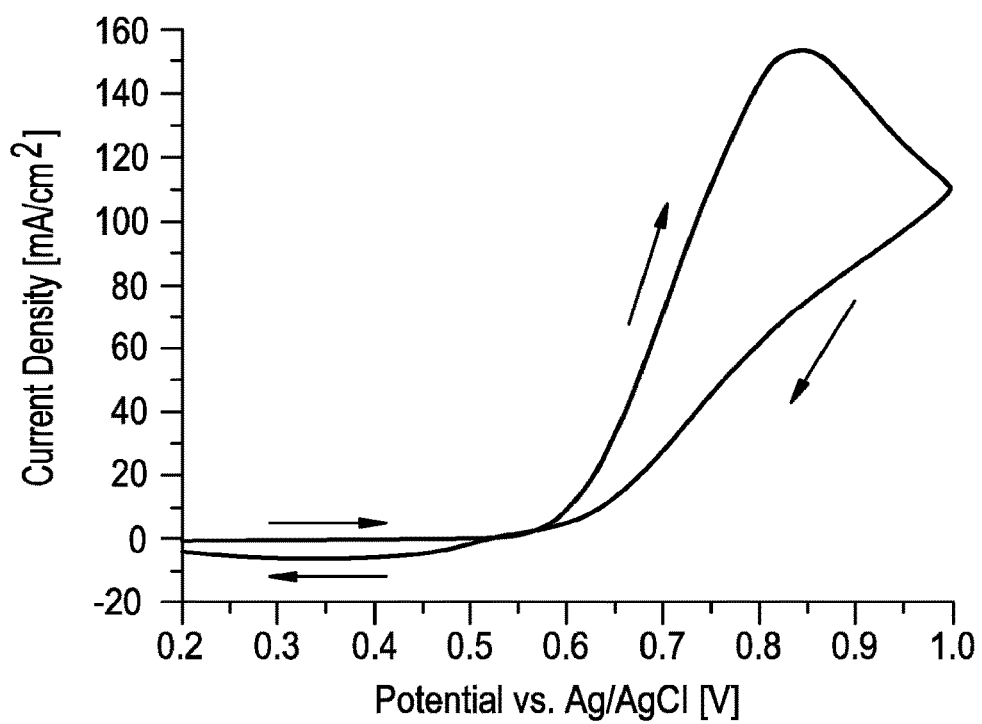
FIGS. 3A-3B are is a set of cyclic voltammograms.

The invention points the way to a high efficiency, long cycle life redox flow battery with reasonable power cost, low energy cost, and all the energy scaling advantages of a flow battery. In some embodiments, the separator can be a cheap hydrocarbon instead of a fluorocarbon, and reactant crossover will be negligible. The electrodes can be inexpensive conductors, conformally coated with a layer of active material so thin as to be negligible in cost [9]. Many of the structural components can be made of cheap plastic, and components that need to be conducting can be protected with conformally coated ultrathin films. Chemical storage can be in the form of cheap, flowing liquids held in cheap plastic tanks and require neither compression nor heating above the liquid's boiling point. The electrochemical cells are based on small organic molecules (SOMs) called quinones (FIGS. 1A-1B). Because quinone-to-hydroquinone cycling occurs rapidly and reversibly in photosynthesis, we are able to employ it to obtain high current density (high current density is very important because the cost per kW of the system is typically dominated by the electrochemical stack's cost per kW, which is inversely proportional to the power density—the product of current density and voltage), high efficiency, and long lifetime in a flow battery. There are hundreds of different quinones spanning a wide range in properties [10-13] such as reduction potential (FIGS. 1A-1B), solubility and stability in water and other solvents. In addition, there are many structures that can be readily screened computationally and synthesized. For example, quinones with high redox potential and candidates with low redox potential, along with other desirable attributes can be identified based on computation screens. In one embodiment, a full cell includes a low redox potential quinone/hydroquinone couple and a bromine/bromide counterelectrode. In another embodiment, the full cell includes a high redox potential quinone/hydroquinone couple vs. a low redox potential quinone/hydroquinone couple. A performance target is 80% round-trip efficiency in each cell at 0.25 W/cm$^2$.

The organic quinone species, e.g., anthraquinones, can be synthesized [39] from inexpensive commodity chemicals that cost a factor of three less per kWh of storage than the vanadium metal ions used in the most highly commercialized flow battery systems. It also permits further organic functionalization to increase the cell voltage and energy storage capacity. Upon scale-up, quinone-based flow batteries can provide massive electrical energy storage at greatly reduced cost.

Small Organic Molecule (SOM) Technical Background

The invention is employs a knowledge base in oxygen-free fuel cells [14-16]. There is also a growing knowledge base on SOM electrochemistry for hydrogen storage [17,18]. Organic-based fuel cells have been the subject of numerous studies, many focusing on alcohols (methanol and ethanol) and formic acid (H$^+$COOH$^-$). Cells utilizing these fuels typically rely on high precious metal content catalysts (Pt, Pd, or Ru) [19-21]. Current densities approaching 1 A/cm$^2$ and power densities exceeding 250 mW/cm$^2$ have been obtained in direct formic acid fuel cells [19]. Reactant crossover is more important with methanol than formic acid [21]. Although there are a number of choices for a SOM redox couple [22-24], quinone-based compounds present a highly promising class of SOMs. Quinones are abundant in nature, they play a vital role in oxygen-evolving photosynthesis, and we eat them in green vegetables. In particular, plastoquinone is reversibly and rapidly reduced to plastoquinol as part of the electron transport chain that ultimately leads to the reduction of NADP+ to NADPH, which is then used in the synthesis of useful organic molecules from $CO_2$ [25]. A 2009 publication exploring quinones for flow batteries makes the potential clear for flow batteries based on quinone/hydroquinone couples [26]. They reported one promising quinone/hydroquinone couple (sulfonic quinol) as the positive electrode against the conventional $Pb/PbSO_4$ negative solid electrode. They obtained disappointing current densities of order 10 $mA/cm^2$. Indeed the reported [13] exchange current density is relatively high for the para-benzoquinone/hydroquinone couple on smooth Pt. It is comparable to that for the chlorine/chloride couple on smooth $RuO_2$—the basis of the commercial Dimensionally Stabilized Anode (DSA) for the Chlor-Alkali industry [27].

The quinone to hydroquinone reduction reaction consists of converting an oxygen that is doubly bonded ("=O") to an $sp^2$ $C_6$ ring into a singly-bonded hydroxyl ("—OH"), as shown in FIG. 2A. An electrode contributes an electron as the acidic electrolyte provides the proton. This typically occurs with pairs of oxygens in the ortho or para configurations; in aqueous solutions the two oxygen sites undergo the reaction at potentials that are virtually indistinguishable. The transition from the hydroquinone to the quinone involves simply removing protons without disrupting the rest of the bonding (FIG. 2B), and so these molecules are exceedingly stable. Because the redox potentials shift with changing solvent, but the hierarchy is much less affected, the 2-Volt range reported in dimethyl sulfoxide in FIG. 1A is encouraging for the prospects in aqueous electrolyte (FIG. 1B). The first concern we have in creating a quinone-based flow battery is selecting a quinone with the appropriate value of the redox potential (FIGS. 1A-1B). In aqueous solutions the positive electrode cannot operate at voltages above about 1.5 V vs. Standard Hydrogen Electrode (SHE) or else $O_2$ evolution becomes significant. The negative electrode cannot operate at voltages below about −0.2 V to 0 V (depending on electrocatalyst) vs. SHE or else $H_2$ evolution becomes significant. These reactions are near the ends of the range of potentials shown in FIG. 1B. The survey, from which selections are shown in FIG. 1B, is limited by some discrepancies in reported literature values, e.g. Nivinskas et al. [28] claim a redox potential of 0.040 V for tetramethylbenzoquinone, whereas Song et al. claim 0.068 V [29]. Nevertheless, it is clear from the figure that adding electron-withdrawing groups, such as Cl, raises the redox potential whereas adding electron-donating groups, such as methyl or isopropyl, lowers the redox potential.

In addition to redox potential, important molecular characteristics include solubility, stability, toxicity, and potential or current market price. High solubility is important because the mass transport limitation at high current density in a full cell is directly proportional to the solubility. Solubility can be enhanced by attaching polar groups such as the sulfonate groups, as in 1,2-Dihydroxybenzene-3,5-disulfonic acid (FIG. 1B). Stability is important not only to prevent chemical loss for long cycle life, but also because polymerization on the electrode can compromise the electrode's effectiveness. Stability against water and polymerization can be enhanced by replacing vulnerable C—H groups adjacent to C+O groups with more stable groups such as C—R, where R is optionally substituted $C_{1-6}$ alkyl, hydroxy, optionally substituted $C_{1-6}$ alkoxy, $SO_3H$, amino, nitro, carboxyl, phosphoryl, or phosphonyl.

Many quinones or hydroquinones are available commercially on a small scale, and their current market price sets an upper limit on what the price might be at large scale. The very common 1,4-parabenzoquinone ("BQ"), for example, currently costs only about $10.53/kWh, assuming a 1-V cell, as shown in Table 2. Other quinones can be synthesized.

TABLE 2

Market prices of energy storage chemicals and chemicals price of cells made up of two such chemicals. For comparison we have assumed cell voltages of 1.2 V for vandium and 1.0 V for all other chemicals.

| Compound | $/kg | Source | Eeq [V] | $/kWh per side | Full Cell | $/kWh |
|---|---|---|---|---|---|---|
| Vanadium pentoxide ($V_2O_5$) | $28.48 | USGS (cost in 2011) | 1.2 | $80.54 | Benzoquinone with Bromine | $15.19 |
| Benzoquinone (BQ) | $5.27 | Shanghai Smart Chemicals Co | 1 | $10.63 | Benzoquinone with $CO_2$ | $11.22 |
| Bromine ($Br_2$) | $1.53 | USGS (cost in 2006) | 1 | $4.57 | Benzoquinone with Benzoquinone | $21.25 |
| Carbon Dioxide ($CO_2$) | $0.73 | Airgas price for bulk $CO_2$ | 1 | $0.60 | Vanadium with Vanadium | $161.08 |
| Formic Acid (HCOOH) | $1.20 | DNV Risk Management Firm | 1 | $1.03 | | |

Examples of quinones useful in the invention include those of formulas (A)-(D):

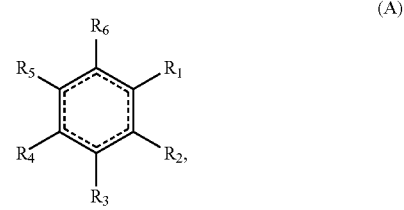

(A)

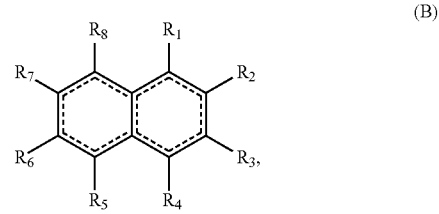

(B)

-continued

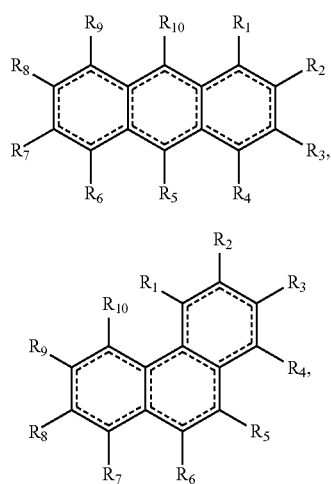
(C)

(D)

wherein each of $R_1$-$R_{10}$ is independently selected from H, optionally substituted $C_{1-6}$ alkyl, halo, hydroxy, $C_{1-6}$ alkoxy, $SO_3H$, amino, nitro, carboxyl, phosphoryl, phosphonyl, and oxo, or an ion thereof, provided that two of $R_1$-$R_6$ for formula (A) are oxo, two or four of $R_1$-$R_8$ for formula (B) are oxo, and two, four, or six of $R_1$-$R_{10}$ for formulas (C) and (D) are oxo, wherein the dashed lines indicate that the monocylic ring of formula (A), the bicyclic ring of formula (B), and the tricyclic rings of formulas (C) and (D) are fully conjugated. Typically at least one of the R groups that is not oxo for each of formulas (A)-(D) is not H. In certain embodiments, none of the R groups for formulas (A)-(D) are H. Other formulas are (I), (II), and (III):

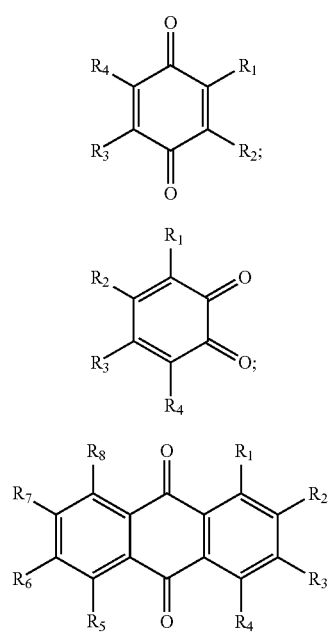
(I)

(II)

(III)

wherein each of $R_1$-$R_8$ is independently selected from H, $C_{1-6}$ alkyl (e.g., methyl, ethyl, propyl, or isopropyl), halo (e.g., F, Cl, or Br), hydroxy, $C_{1-6}$ alkoxy (e.g., methoxy), and $SO_3H$, or an ion thereof. Typically, at least one of $R_1$-$R_8$ ($R_1$-$R_4$ for (I) and (II)) is not H. In other embodiments, none of $R_1$-$R_8$ ($R_1$-$R_4$ for (I) and (II)) is H.

Additional quinones are of any of the following formulas.

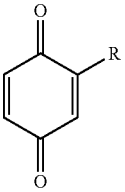 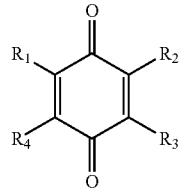

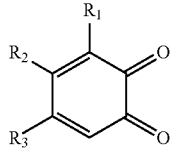 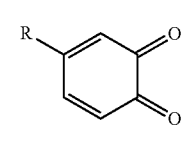

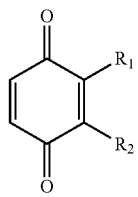 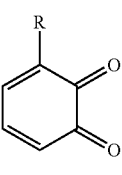 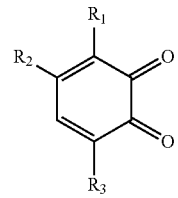

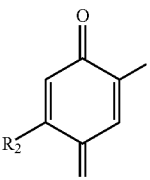 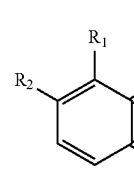 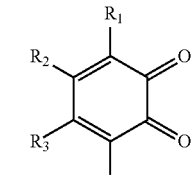

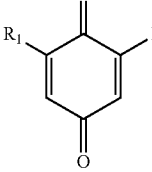 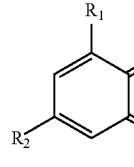 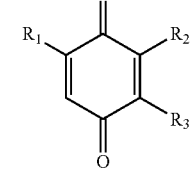

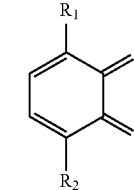 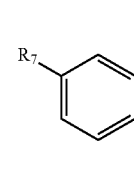

 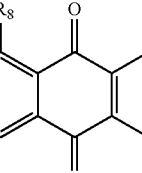

 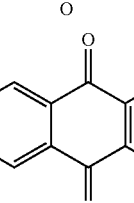

-continued
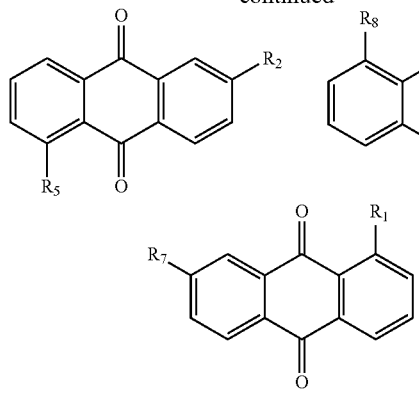
-continued
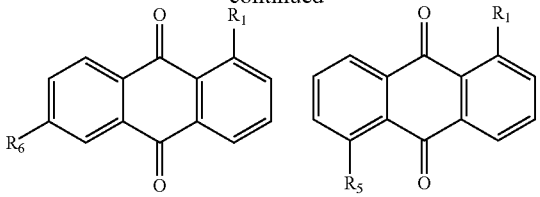
Specific examples of quinones are as follows:
Additional quinones are in the following Table 3:
| Entry | Name | Diagram |
|---|---|---|
| 1 | 9,10-anthraquinone-2,7-disulfonic acid | |
| 2 | 9,10-anthraquinone-2,6-disulfonic acid | |
| 3 | 9,10-anthraquinone-1,8-disulfonic acid | |
| 4 | 9,10-anthraquinone-1,5-disulfonic acid | |
| 5 | 9,10-anthraquinone-2-sulfonic acid | |

-continued
| Entry | Name | Diagram |
|---|---|---|
| 6 | 9,10-anthraquinone-2,3-dimethanesulfonic acid | 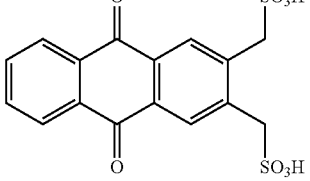 |
| 7 | 1,8-dihydroxy-9,10-anthraquinone-2,7-disulfonic acid | 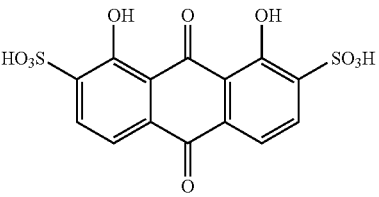 [SMILES: O=C1c2ccc(S(=O)(=O)O)c(O)c2C(=O)c2c1ccc(S(=O)(=O)O)c2O] |
| 8 | 1,5-dihydroxy-9,10-anthraquinone-2,6-disulfonic acid | 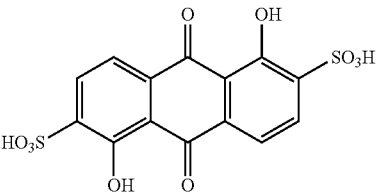 [SMILES: O=C1c2ccc(S(=O)(=O)O)c(O)c2C(=O)c2ccc(S(=O)(=O)O)c(O)c21] |
| 9 | 1,4-dihydroxy-9,10-anthraquinone-2-sulfonic acid | 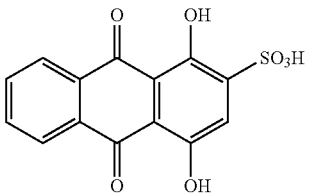 [SMILES: O=C1c2ccccc2C(=O)c2c(O)c(S(=O)(=O)O)cc(O)c21] |
| 10 | 1,3,4-trihydroxy-9,10-anthraquinone-2-sulfonic acid | 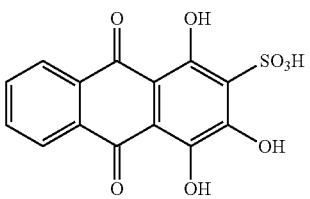 [SMILES: O=C1c2ccccc2C(=O)c2c(O)c(S(=O)(=O)O)c(O)c(O)c21] |
| 11 | 1,2-naphthoquinone-4-sulfonic acid | 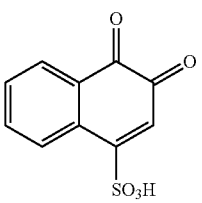 [SMILES: O=C1C=C(S(=O)(=O)O)c2ccccc2C1=O] |
| 12 | 1,4-naphthoquinone-2-sulfonic acid | 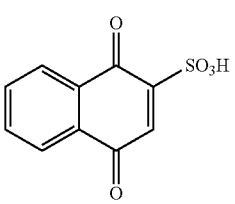 [SMILES: O=C1C=C(S(=O)(=O)O)C(=O)c2ccccc21] |

-continued

| Entry | Name | Diagram |
|---|---|---|
| 13 | 2-chloro-1,4-naphthoquinone-3-sulfonic acid | (structure: naphthoquinone with SO₃H and Cl) |
| 14 | 2-bromo-1,4-naphthoquinone-3-sulfonic acid | (structure: naphthoquinone with SO₃H and Br) |

Yet further quinones are the in Table 4:

(Anthraquinone structure with substituents $R_1$, $R_3$, $R_4$, $R_5$, $R_6$, $R_8$; positions with $HO_3S$ and $SO_3H$)

| ID | —OH substituted | $R_1$ | $R_3$ | $R_4$ | $R_5$ | $R_6$ | $R_8$ |
|---|---|---|---|---|---|---|---|
| 1 | Non- | H | H | H | H | H | H |
| 2 |  | OH | H | H | H | H | H |
| 3 | Mono- | H | OH | H | H | H | H |
| 4 |  | H | H | OH | H | H | H |
| 5 |  | OH | OH | H | H | H | H |
| 6 | Di- | OH | H | OH | H | H | H |
| 7 |  | OH | H | H | OH | H | H |
| 8 |  | OH | H | H | H | OH | H |
| 9 |  | OH | H | H | H | H | OH |
| 10 |  | H | OH | OH | H | H | H |
| 11 |  | H | OH | H | OH | H | H |
| 12 |  | H | OH | H | H | OH | H |
| 13 |  | H | H | OH | OH | H | H |
| 14 |  | OH | OH | OH | H | H | H |
| 15 |  | OH | OH | H | OH | H | H |
| 16 |  | OH | OH | H | H | OH | H |
| 17 |  | OH | OH | H | H | H | OH |
| 18 | Tri- | OH | H | OH | OH | H | H |
| 19 |  | OH | H | OH | H | OH | H |
| 20 |  | OH | H | OH | H | H | OH |
| 21 |  | OH | H | H | OH | OH | H |
| 22 |  | H | OH | OH | OH | H | H |
| 23 |  | H | OH | OH | H | OH | H |
| 24 |  | OH | OH | OH | OH | H | H |
| 25 |  | OH | OH | OH | H | OH | H |
| 26 |  | OH | OH | OH | H | H | OH |
| 27 |  | OH | OH | H | OH | OH | H |
| 28 | Tetra- | OH | OH | H | OH | H | OH |
| 29 |  | OH | OH | H | H | OH | OH |
| 30 |  | OH | H | OH | OH | OH | H |
| 31 |  | OH | H | OH | OH | H | OH |
| 32 |  | H | OH | OH | OH | OH | H |
| 33 |  | OH | OH | OH | OH | OH | H |
| 34 | Penta- | OH | OH | OH | H | OH | OH |
| 35 |  | OH | OH | OH | OH | OH | OH |
| 36 | Hexa- | OH | OH | OH | OH | OH | OH |

Quinones or hydroquinones may be present in a mixture. For example, a mixture of sulfonated quinones can be produced by reacting sulfuric acid with an anthraquinone, e.g., 9,10-anthraquinone.

Quinones may be dissolved or suspended in aqueous solution in the batteries. The concentration of the quinone ranges, for example, from 3 M to liquid quinone, e.g., 3-15 M. In addition to water, solutions may include alcohols (e.g., methyl, ethyl, or propyl) and other co-solvents to increase the solubility of a particular quinone. In some embodiments, the solution of quinone is at least 10%, 20%, 30%, 40%, 50%, 60%, 70%, or 80% water, by mass. Alcohol or other co-solvents may be present in an amount required to result in a particular concentration of quinone. The pH of the aqueous solution for a quinone may also be adjusted by addition of acid or base, e.g., to aid in solubilizing a quinone.

A Quinone Flow Battery

This cell is based on a quinone/hydroquinone couple with low redox potential (an example of which is shown in FIGS. 2A-2B) vs. redox active species, e.g., the bromide/bromine couple. Other redox active species include chlorine, iodine, oxygen, vanadium, chromium, cobalt, iron, manganese, cobalt, nickel, copper, or lead, e.g., a manganese oxide, a cobalt oxide or a lead oxide. If the quinone redox potential is −0.02 V, then the equilibrium potential will be about 1.1 V, varying with concentration according to the Nernst Equation. Examples of quinone/hydroquinone couples with a low redox potential include 2-Methyl-5-iso-propyl-1,4-benzoquinone or 2,6-Methoxyl-1,4-benzoquinone (FIG. 1B).

A high-potency low-cost chlorine/chloride and bromine/bromide electrocatalyst is known [30], and a powerful chlorine/chloride cell has been developed [9,31]. While the use of bromine is advantageous in many systems, use in a manned environment, such as the home, is limited based on toxicity concerns; therefore bromine-based systems are best focused on industrial and some commercial applications. Nevertheless, the toxicity is not so high, and its safe handling not so difficult, so as to prevent its commercialization in zinc-bromine batteries.

An All-Quinone/Hydroquinone Flow Battery.

This cell is based on the quinone/hydroquinone couple with high redox potential vs. quinone/hydroquinone with low redox potential. An all-quinone cell brings many advantages. Many of the structural components could be made of cheap plastic. The molecules are big enough that the separator is expected to be much cheaper than Nafion [32-34], and reactant crossover will still be negligible. The electrodes can be inexpensive conductors such as titanium [35] or glassy carbon, conformally coated with layer of active material so thin as to be negligible in cost. Engineering for two-phase flow will be unnecessary. Chemical storage can be in the form of flowing liquids requiring neither compression nor heating above the boiling point of water.

Electrode Materials

Electrode materials can be screened for good molecule-specific electrode kinetics. Although evidence indicates that quinone/hydroquinone catalysis is not a significant barrier, some electrode materials are expected to become deactivated due to the chemisorption of molecules or fragments, or the polymerization of reactants. Electrodes for use with a quinone or hydroquinone include any carbon electrode, e.g., carbon paper electrodes, carbon felt electrodes, or carbon nanotube electrodes. Electrodes suitable for other redox active species are known in the art.

Fabrication of Full Cell

The fabrication of full cells requires the selection of appropriate electrodes. Bromine and quinone electrodes can be made of a high specific surface area conducting material, such as nanoporous metal sponge [35], which has synthesized previously by electrochemical dealloying [36], or conducting metal oxide, which has been synthesized by wet chemical methods and shown to be good for bromine [9,30]. Chemical vapor deposition can be used for conformal coatings of complex 3D electrode geometries by ultra-thin electrocatalyst films.

Fabrication of Testing Hardware and Cell Testing

The balance of system around the cell will include fluid handling and storage, and voltage and round-trip energy efficiency measurements can be made. Systems instrumented for measurement of catholyte and anolyte flows and pH, pressure, temperature, current density and cell voltage may be included and used to evaluate cells. Testing can be performed as reactant and acid concentrations and the cell temperature are varied. In one series of tests, the current density is measured at which the voltage efficiency drops to 90%. In another, the round-trip efficiency is evaluated by charging and discharging the same number of amp-minutes while tracking the voltage in order to determine the energy conversion efficiency. This is done initially at low current density, and the current density is then systematically increased until the round-trip efficiency drops below 80%. Fluids sample ports can be provided to permit sampling of both electrolytes, which will allow for the evaluation of parasitic losses due to reactant crossover or side reactions. Electrolytes can be sampled and analyzed with Inductively Coupled Plasma Mass Spectrometry, and other standard techniques.

Ion Conducting Barriers

The ion conducting barrier allows the passage of protons but not a significant amount of the quinone, hydroquinone, or other redox active species. Example ion conducting barriers are Nafion, i.e., sulfonated tetrafluoroethylene based fluoropolymer-copolymer, hydrocarbons, e.g., polyethylene, and size exclusion barriers, e.g., ultrafiltration or dialysis membranes with a molecular weight cut off of 100, 250, 500, or 1,000 Da. For size exclusion membranes, the molecular weight cut off will be determined based on the molecular weight of the quinone, hydroquinone, or other redox active species employed.

Additional Components

A battery of the invention may include additional components as is known in the art. Quinones, hydroquinones, and other redox active species dissolved or suspended in aqueous solution will be housed in a suitable reservoir. A battery may further include pumps to pump aqueous solutions or suspensions past one or both electrodes. Alternatively, the electrodes may be placed in a reservoir that is stirred or in which the solution or suspension is recirculated by any other method, e.g., convection, sonication, etc. Batteries may also include graphite flow plates and aluminum current collectors.

EXAMPLES

Example 1

Figure 3B:
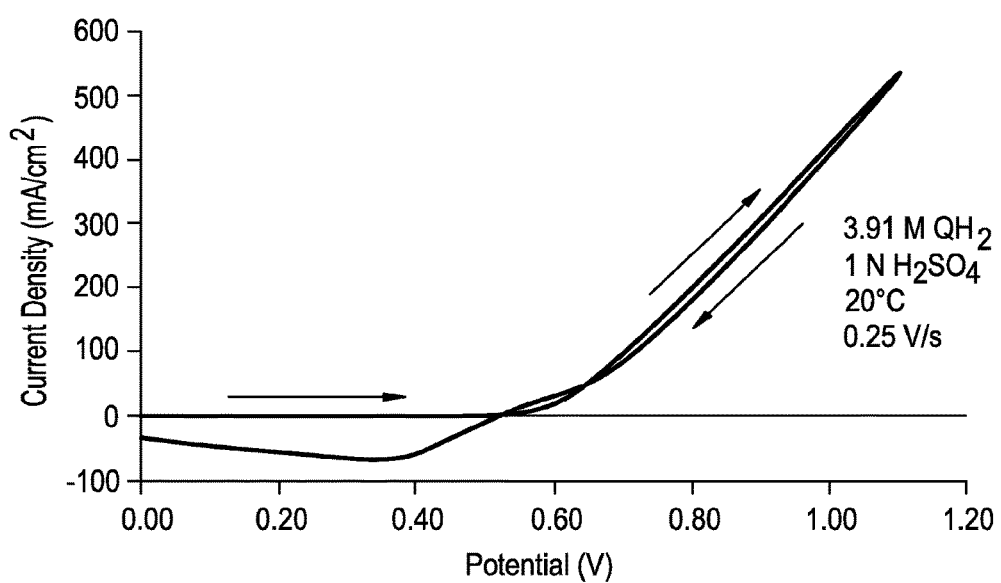

1 molal 1,2-ortho-benzohydroquinone (catechol) was oxidized in 1 N $H_2SO_4$ at a flat Pt electrode, obtaining the cyclic voltammetry curves shown in FIG. 3A. The sweep starts at (0.2 V, 0 mA/cm$^2$) and proceeds at 25 mV/s to the right. At about 600 mV vs. Ag/AgCl (the known $E^0$ is 795 mV vs. SHE), the current density increases as catechol is oxidized to the orthoquinone form. The oxidative current density peaks at about 150 mA/cm$^2$. The peak and downturn are caused by reactant depletion in a quiescent (non-flowing, non-stirred) electrolyte. In a test at a higher concentration of 3.9 molal (FIG. 3B), we observe asymmetric oxidation and reduction peaks, achieving current densities above 500 mA/cm$^2$ for the former. The asymmetric shape of the curve in FIG. 3B arises because the quinone form is unstable in aqueous solution. In addition the limited solubility of ortho-benzoquinone (0.06 M) compared to its reduced form precludes symmetric behavior at high concentration.

Example 2

Figure 4:
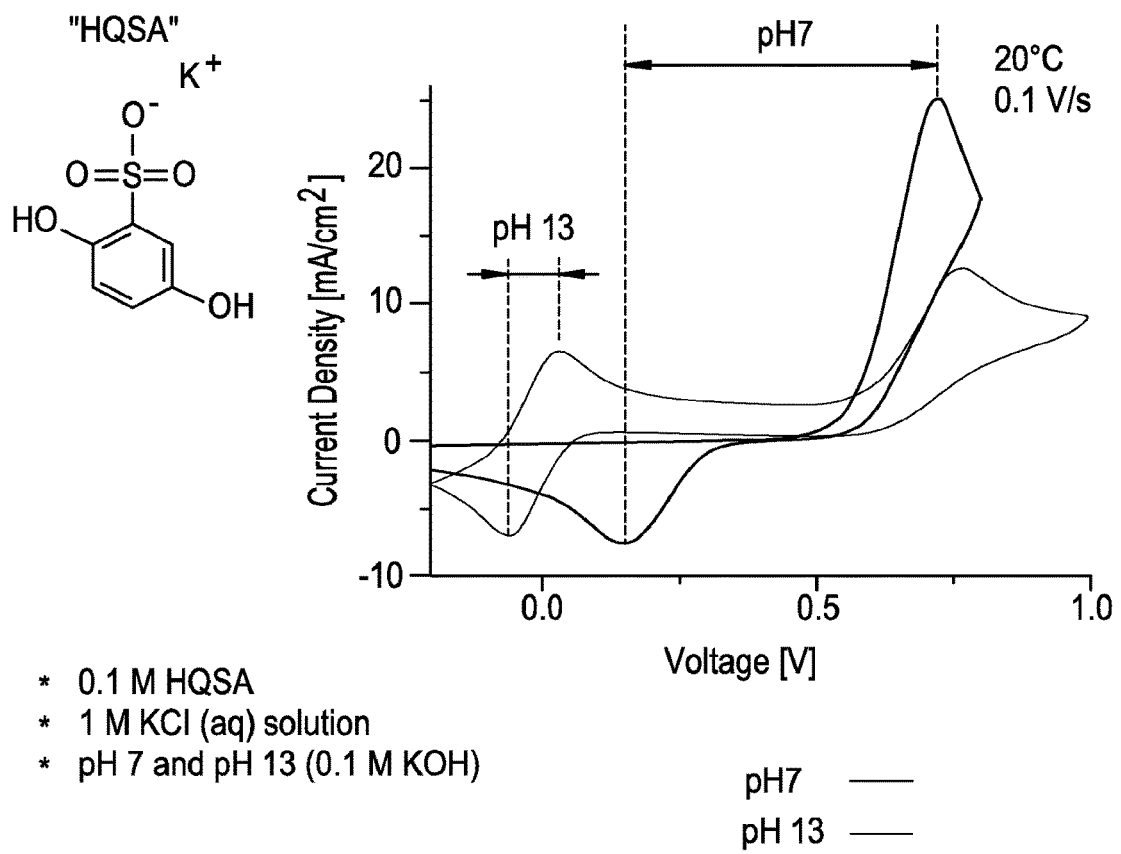
FIG. 4 is a half-cell cyclic voltammogram for hydroquinone sulfonic acid.

The half-cell redox behavior of hydroquinone-2-sulfonic acid (HQSA) is shown in FIG. 4. At a pH of 7 a rise in current density was observed beginning near 0.5 V and peaking at higher voltage. Upon reversing the direction of the voltage sweep, negative current (indicating a reduction event) was observed near 0.3 V. The large difference between where the oxidation and reduction currents are observed indicates a chemical process was likely occurring. In this case, upon oxidation of HQSA to the quinone form, water reacted with the quinone to form a new species. This species was reduced at the lower 0.3 V potential. At a pH of 13, the reaction became rapid and reversible because in basic solution the —OH groups on HQSA became deprotonated. The positive and negative current density observed near 0 V was indicative of a 2-electron redox event with no protons having been exchanged.

Example 3

Figure 5A:
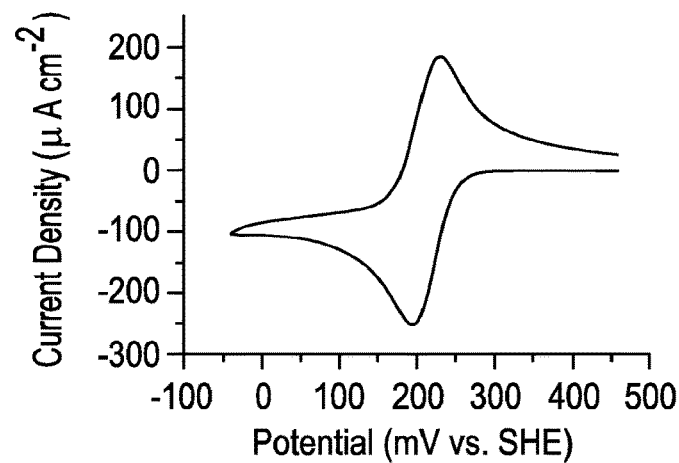
FIG. 5A is a cyclic voltammogram of AQDS (1 mM) in 1 M $H_2SO_4$ on a glassy carbon electrode (scan rate=25 mV s$^{-1}$).
Figure 5B:
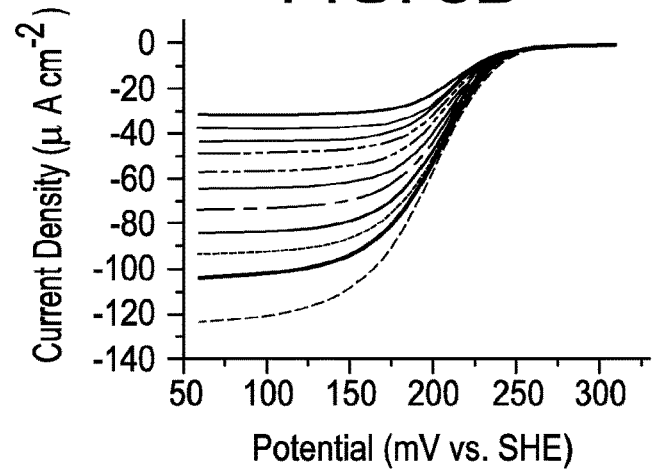
FIG. 5B is a graph of rotating disk electrode measurements using a glassy carbon electrode in 1 M $H_2SO_4$ at eleven rotation rates ranging from 200 (red) to 3600 rpm (dk. green).

AQDS was subjected to half-cell electrochemical measurements. Cyclic voltammetry of a 1 mM solution of AQDS in 1 M sulfuric acid on a glassy carbon disc working electrode showed current peaks corresponding to reduction and oxidation of the anthraquinone species (FIG. 5A). The peak separation of 34 mV was close to the 59 mV/n, where n was the number of electrons involved, expected for a two-electron process.

Example 4

The glassy carbon disk in Example 3 was rotated at a variety of rates yields mass-transport limited currents from which the AQDS diffusion coefficient (D=3.8(1)×10$^{-6}$ cm$^2$ $s^{-1}$)(compare D in [38]) and kinetic reduction rate constant could be determined (FIGS. 5B, 6, 7, and 8). Kinetic data showed the rate constant for AQDS reduction on glassy carbon to be $k_0=7.2(5)\times10^{-3}$ cm $s^{-1}$, which exceeded the rate constant on Au [39]. This rate constant was faster than that found for many other species used in flow cells such as $V^{3+}/V^{2+}$, $Br_2/Br^-$, and $S_4^{2-}/S_2^{2-}$ (see Table 2 in [40]). The electrochemical reversibility of the two-electron redox reaction was confirmed by the slope of the Tafel plot (FIG. 8), which gave the transfer coefficient $\alpha=0.474$, which is close to the value of 0.5 expected for an ideally reversible reaction.

Example 5

Figure 5C:
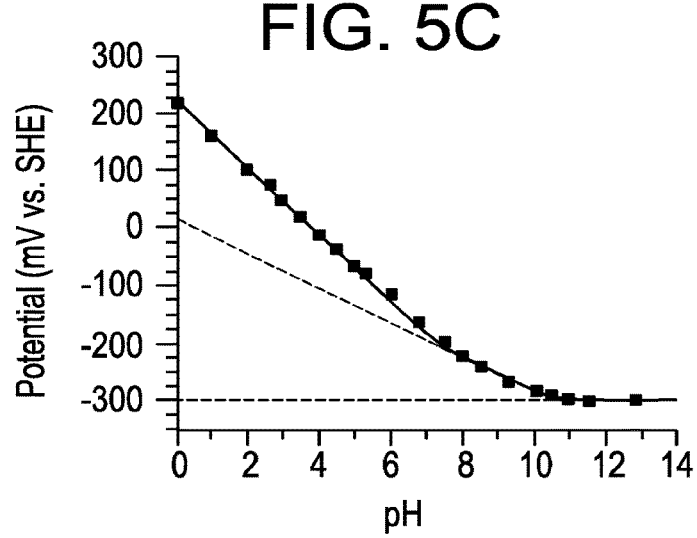
FIG. 5C is a Pourbaix diagram of AQDS. Solid lines indicate slopes of −59 mV/pH, −30 mV/pH, and 0 mV/pH, corresponding to two-, one-, and zero-proton processes respectively. Dashed lines linearly extrapolate the one- and zero-proton processes to give E$^0$ values of 18 mV (2 e$^-$/1 H$^+$) and −296 mV (2 e$^-$/0 H$^+$).
Figure 6:
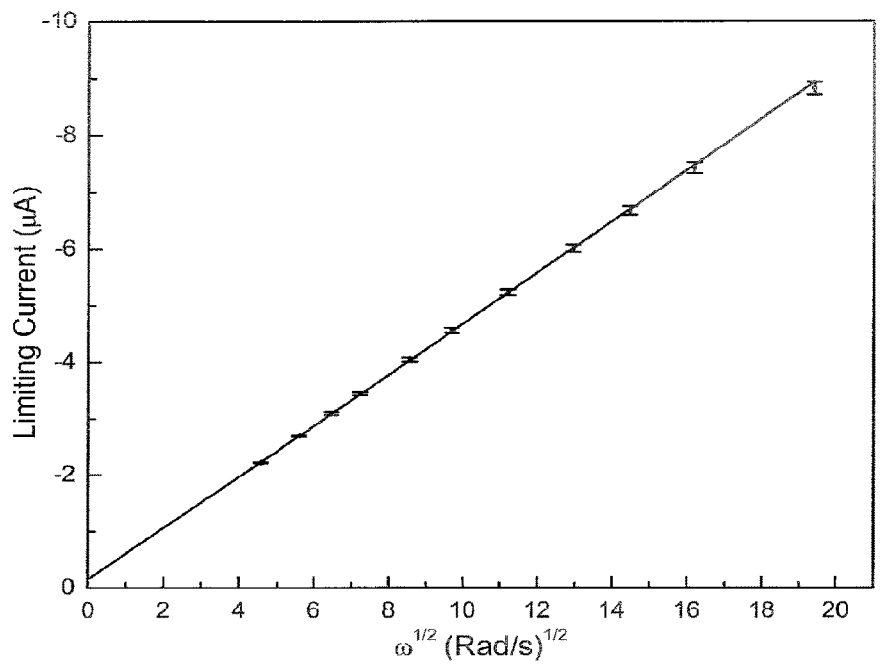
FIG. 6 is a Levich plot (current vs. rotation rate) of 1 mM AQDS in 1 M $H_2SO_4$. Best fit line has a slope of 0.453(2) $\mu A\ s^{1/2}\ rad^{-1/2}$.
Figure 7:
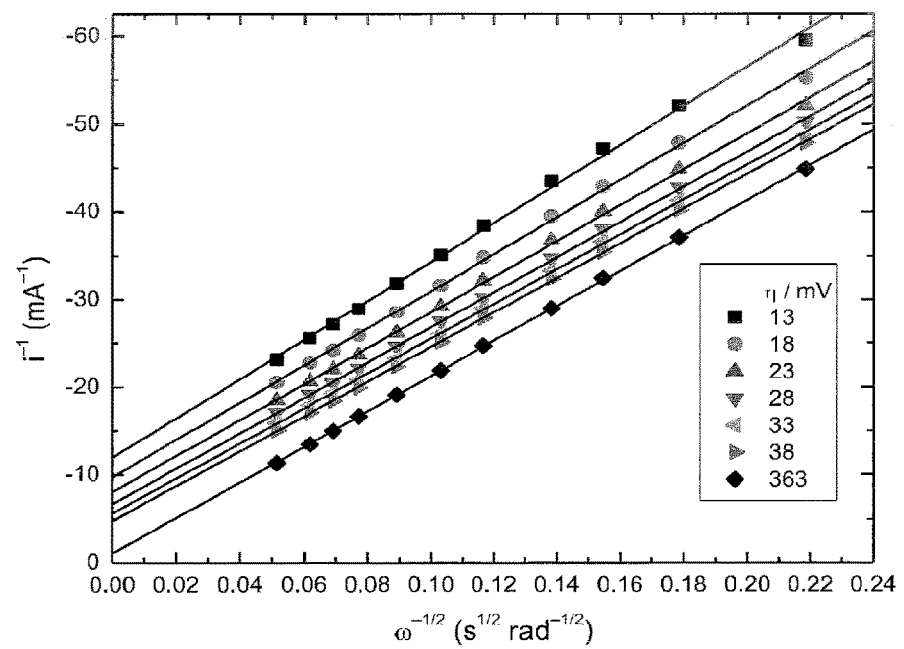
FIG. 7 is a Koutecký-Levich plot (current$^{-1}$ vs. rotation rate$^{-1/2}$).
Figure 8:
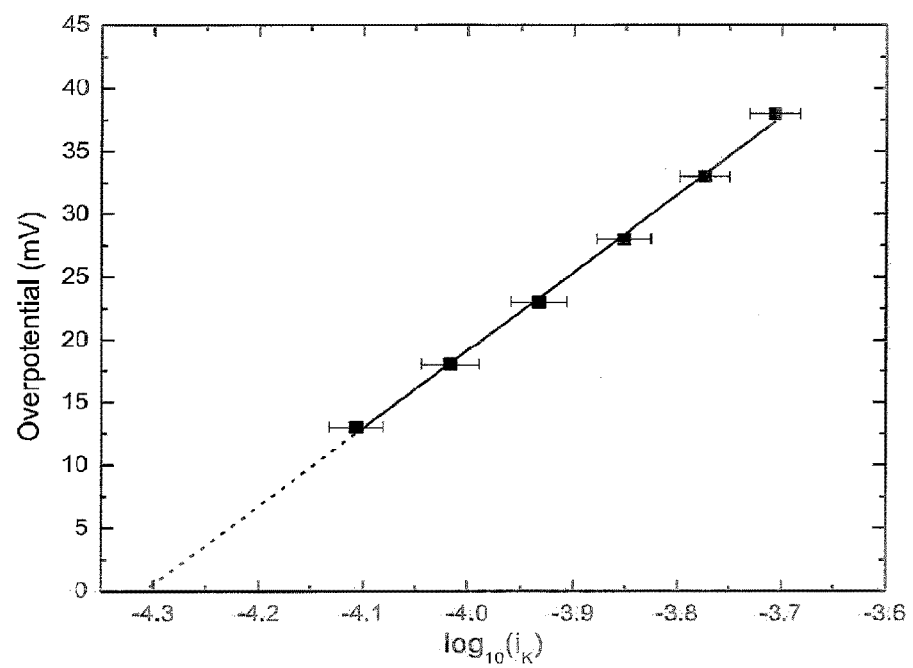
FIG. 8 is a Tafel plot (overpotential vs. log(current)) constructed using the current response in the absence of mass-transport at low overpotentials, extrapolated from the zero-intercept of FIG. 7 (infinite rotation rate). Best fit line is the function y=62(x+4.32). This yields $\alpha$=0.474(2) and $k_0$=7.2(5)×10$^{-3}$ cm s$^{-1}$.

To further understand the AQDS redox behavior, we generated a Pourbaix diagram (FIG. 5C) of the equilibrium potential of the AQDS redox couple vs. pH. Aqueous 1 mM solutions of AQDS disodium salt were prepared and pH buffered using the following chemicals: sulfuric acid (1 M, pH 0), $HSO_4^-/SO_4^{2-}$ (0.1 M, pH 1-2), AcOH/AcO$^-$ (0.1 M, pH 2.65-5), $H_2PO_4^-/HPO_4^{2-}$ (0.1 M, pH 5.3-8), $HPO_4^{2-}/PO_4^{3-}$ (0.1 M, pH 9.28-11.52), and KOH (0.1 M, pH 13). The pH of each solution was adjusted with 1 M $H_2SO_4$ or 0.1 M KOH solutions. In acidic solutions (pH<7), the 59 mV/pH slope indicated that a two-electron, two-proton process occurs ([39]). In more basic conditions (7<pH<11), a two-electron, one-proton process occurred, giving a 30 mV/pH slope. The potential became pH-independent at values greater than 11, which indicated a two-electron, zero-proton process. These results indicated that AQDS performed reversible two-electron redox chemistry in a pH range of 0 to 14, and the protonation state of the reduction product dihydro-AQDS, which yielded approximate $pK_a$ values of 7 and 11.

Example 6

Figure 9:
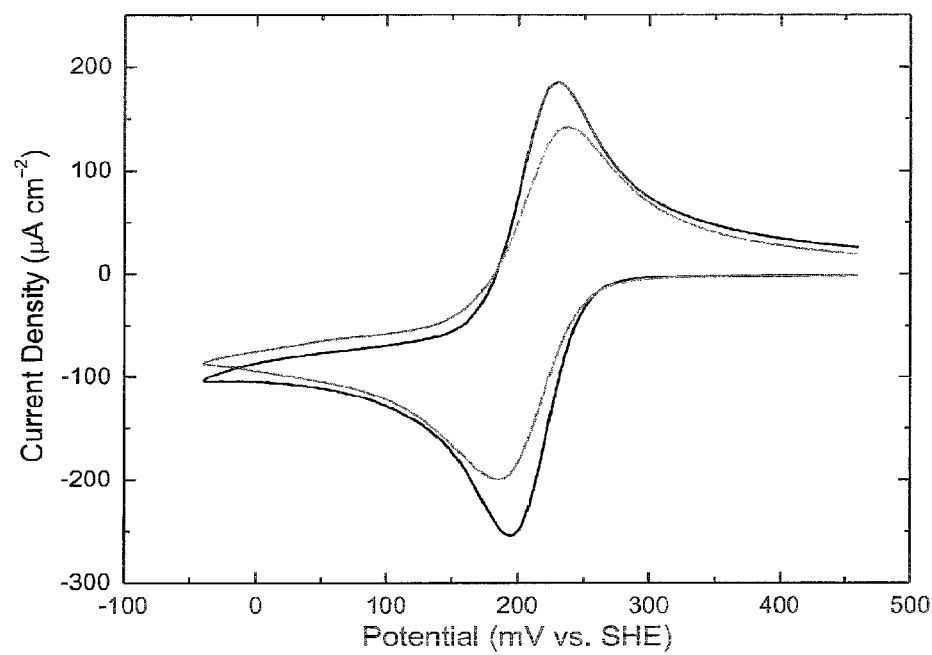
FIG. 9 is a cyclic voltammogram plot of 9,10-anthraquinone-2,7-disulfonic acid (AQDS) 1 mM in 1 M $H_2SO_4$ on a glassy carbon working electrode (black) and of anthraquinone sulfonic acid mixture solution.

A solution of anthraquinone was heated in concentrated sulfuric acid or a solution of 30% $SO_3$ in concentrated sulfuric acid (oleum), resulting in a mixture of sulfonated anthraquinones as previously described [37]. This crude mixture was allowed to cool to room temperature and was diluted with 1 M sulfuric acid to give a solution of 1 mM sulfonated anthraquinone. This solution was subjected to half-cell measurements that demonstrate that the behavior of the mixture of sulfonated anthraquinones was nearly identical to the pure 9,10-anthraquinone-2,7-disulfonic acid illustrated in Example 3, as shown in FIG. 9.

Example 7

Figure 10:
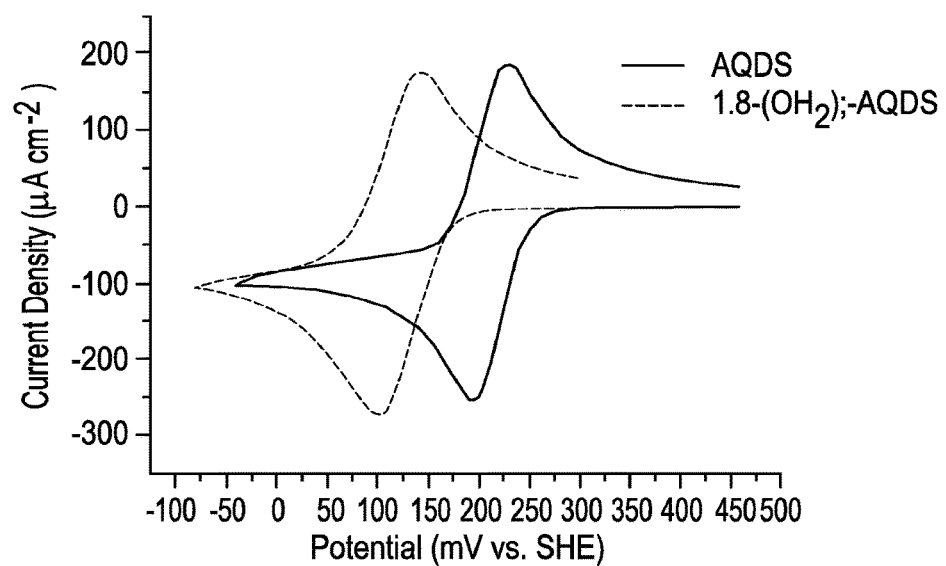
FIG. 10 is a cyclic voltammograms of 9,10-anthraquione-2,7-disulfonic acid (AQDS) and 1,8-dihydroxy-9,10-anthraquinone-2,7-disulfonic acid (1,8-(OH)$_2$-AQDS), showing that the latter has a 95 mV lower reduction potential.

A solution of 1,8-dihydroxy-9,10-anthraquinone was heated in concentrated sulfuric acid and a yellow solid was isolated after addition of NaCl, which contained 1,8-dihydroxy-9,10-anthraquinone-2,7-disulfonic acid disodium salt (1,8-(OH)$_2$-AQDS) in >95% purity. A solution consisting of 1 mM 1,8-(OH)$_2$-AQDS in 1 M $H_2SO_4$ was subjected to half-cell measurements under similar conditions to Example 3. The traces of 1,8-(OH)$_2$-AQDS and AQDS are shown in FIG. 10, and illustrate that the peak potentials of AQDS were shifted by nearly 100 mV by the addition of —OH groups to the AQDS backbone.

Example 8

Figure 11A:
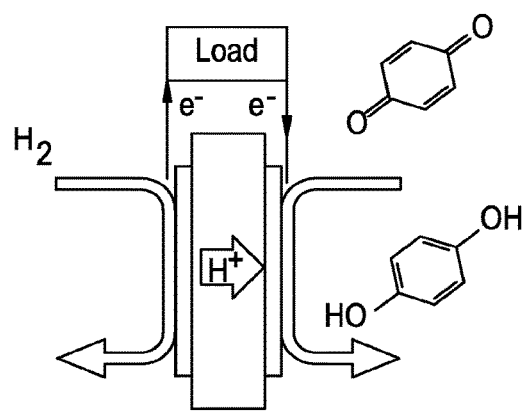
FIG. 11A is a scheme of p-benzoquinone as the positive material and $H_2$ gas as the negative material for fuel cell tests.
Figure 11B:
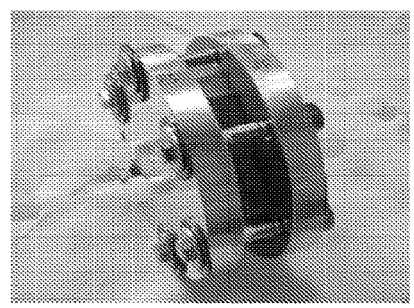
FIG. 11B is an image of the cell used.
Figure 11C:
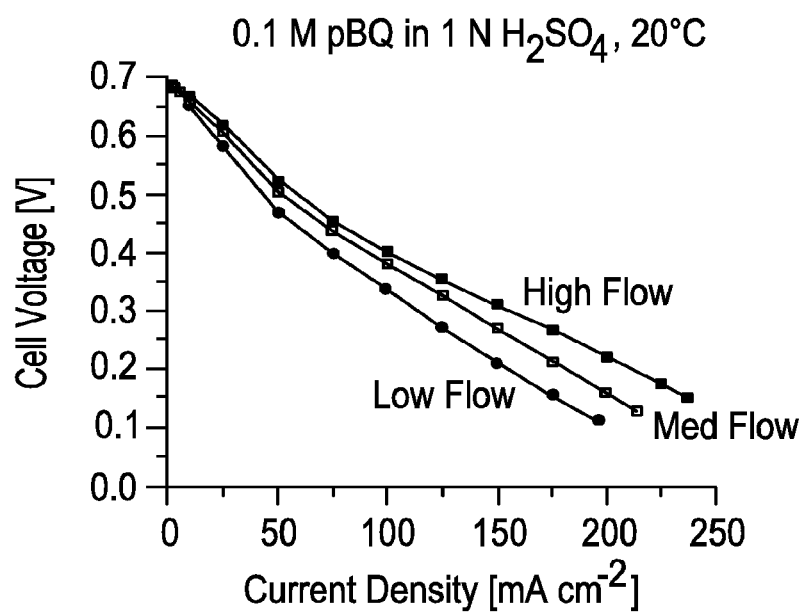
FIG. 11C is a graph of cell potential versus current density for tests in Example 8 using a 0.1 M solution.
Figure 11D:
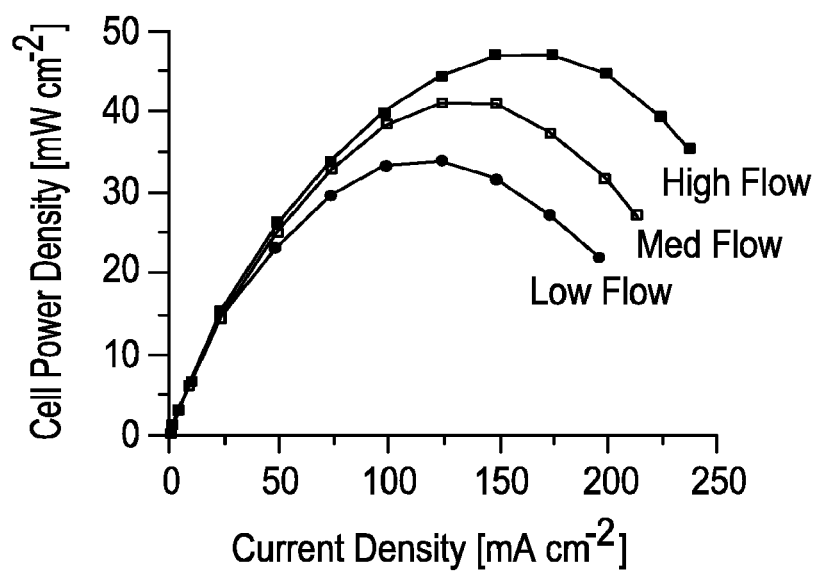
FIG. 11D is a graph of the cell power density as a function of galvanic current density for Example 8.

A quinone-hydrogen fuel cell is illustrated by schematic in FIG. 11A. 1,4-benzoquinone was used as the positive electrode material and $H_2$ gas as the negative material for fuel cell tests. We operated the cell in discharge mode, with the p-benzoquinone/p-hydroquinone mixture recirculated past the quinone electrode on the positive side, and $H_2$ flowing past the hydrogen electrode. The Nafion membrane conducted $H^+$ ions towards the cathode. The cell reached current densities of about 150 mA/cm$^2$ and power densities of about 35 mW/cm$^2$, which were higher than values previously reported using soluble quinones for the positive electrode in a full cell configuration [26]. We used a fuel cell test bench constructed by Sustainable Innovations, LLC, and modified in our lab [9]. FIG. 11B shows an image of the cell used. The cell featured aluminum endplates, pyrolytic graphite current collectors with serpentine flow channels, a 50 µm thick Nafion 212 proton exchange membrane (which prior to use was pretreated using methods previously described [9]), and PTFE/Viton tubing and gasketing throughout. On both sides of the cell, a commercial Pt—Ru/C carbon paper commercial electrode was used. The cell was operated in galvanic mode using previously described methods [9], with high-purity hydrogen gas flowed through the negative side of the cell at 5 psig and quinone solution flowed through the positive side using a Cole Parmer Masterflex pump. The solution consisted of para-benzoquinone in 1 N $H_2SO_4$. Before each set of measurements, an $N_2$ purge was performed to remove any remaining $O_2$ and to ensure there were no leaks in the assembly. After reactant introduction to the cell, the voltage was allowed to stabilize for a few minutes, after which a DC electronic load was used to draw incrementally higher currents from the cell. In general, in order to allow the voltage to stabilize, we waited about 15 seconds after each change in current. In FIG. 11C, we show the cell potential versus current density for tests done using a 0.1 M solution. In general, we observed a nearly linear drop in potential with increasing current density indicating robust electrode kinetics for the redox reaction, i.e. relatively low activation overpotentials. In FIG. 11D, we show the cell power density as a function of galvanic current density. The power density fell off rapidly near the limiting current density.

Example 9

Figure 12:
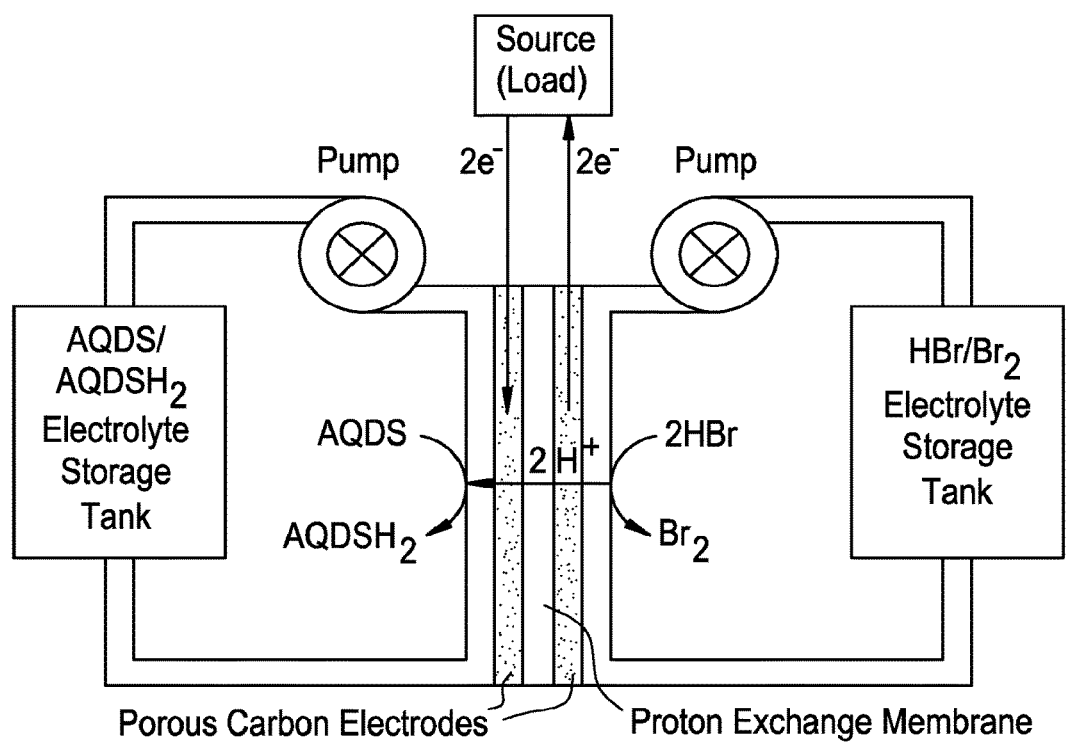
FIG. 12 is a Cell Schematic. Electrolytic/charge mode is shown; the arrows are reversed for galvanic/discharge mode.

Solutions of 9,10-anthraquinone-2,7-disulfonic acid disodium salt and HBr in 1 M sulfuric acid were pumped through a flow cell as outlined in FIG. 12. Circular endplates were machined out of solid aluminum. 3 in.×3 in. pyrolytic graphite blocks with single-serpentine flow channels (channel width=0.0625 in., channel depth=0.08 in., landing between channels=0.031 in., Fuel Cell Technologies, Inc.) were used as current collectors. Pretreated 2 cm$^2$, double-stacked Toray carbon paper electrodes (each of which is about 7.5 µm uncompressed) were used on both sides of the cell. Pretreatment consisted of a 10 min. sonication in isopropyl alcohol followed by a 30 min. immersion in hot (80° C.) 6 M sulfuric acid and then a 4 hr. heat treatment in an air furnace at 400° C. Nafion® 212 (50 µm thick) was used as a proton-exchange membrane (PEM, Alfa Aesar), and PTFE gasketing was used to seal the cell assembly. Membrane pretreatment was done according to previously published protocols [9]. Six bolts (⅜"-16) torqued to 10.2 Nm completed the cell assembly, and PTFE tubing was used to transport reactants and products into and out of the cell. The cell was kept on a hot plate and wrapped in a PID-controlled heating element for temperature control, and the liquid electrolyte reservoirs were heated to improve thermal management. On the positive side of the cell, 35 mL of 1.75

Figure 14A:
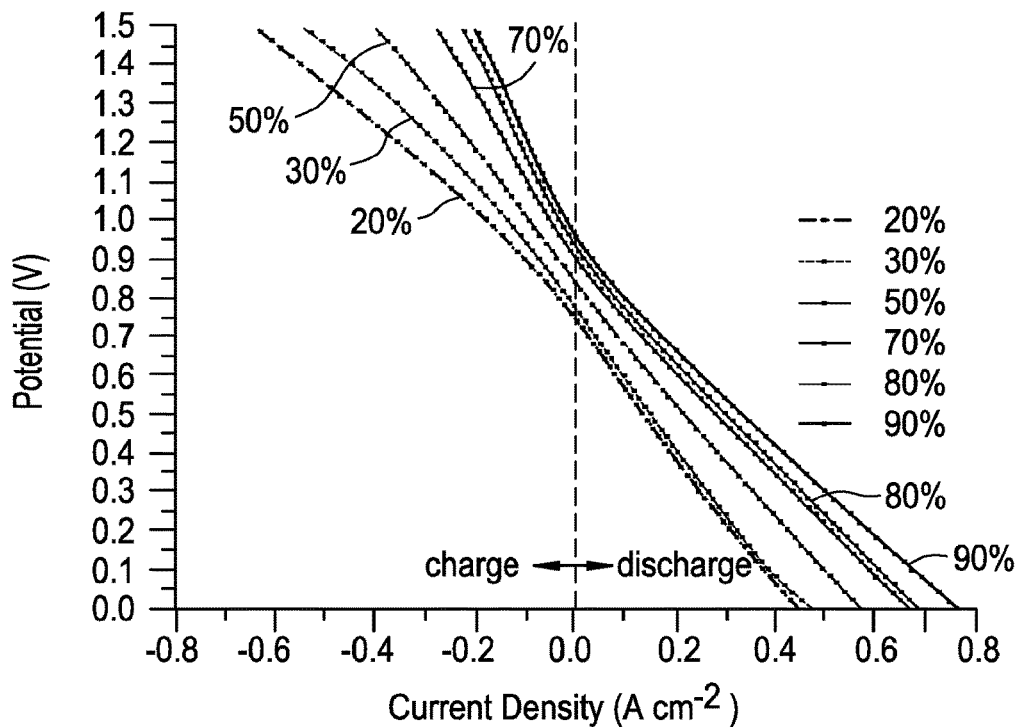
FIG. 14A is a graph of cell potential vs. current density at six different states-of-charge for the cell in Example 9.
Figure 14B:
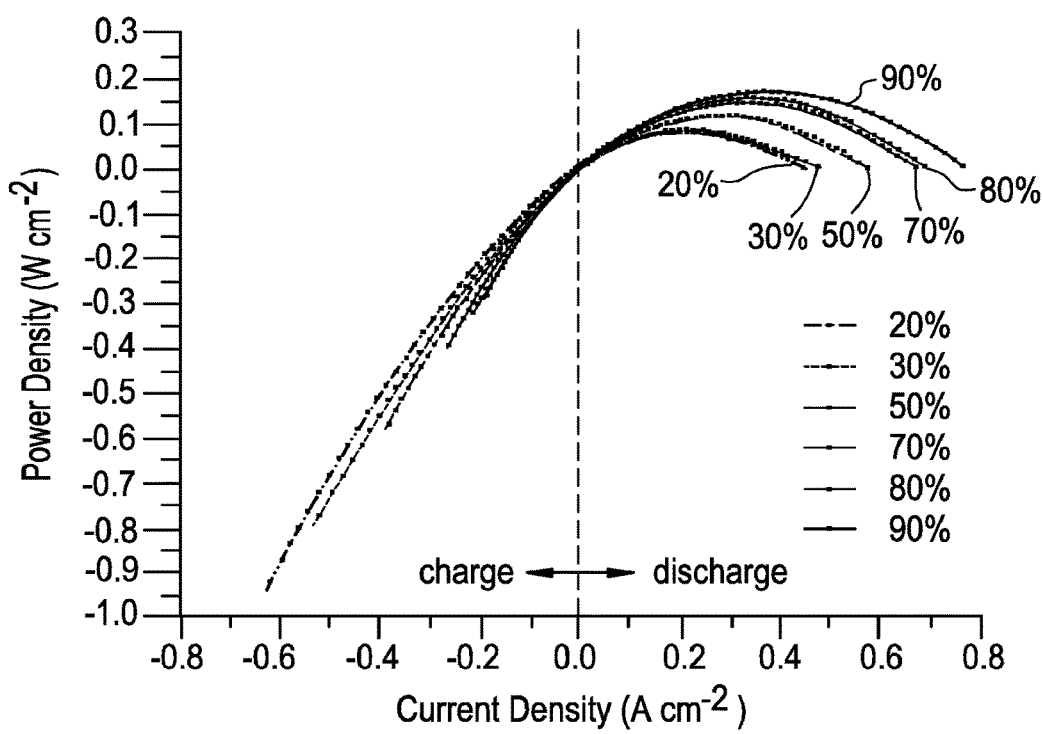
FIG. 14B is a plot of power density vs. current density at the same six states of charge as FIG. 14A.
Figure 15:
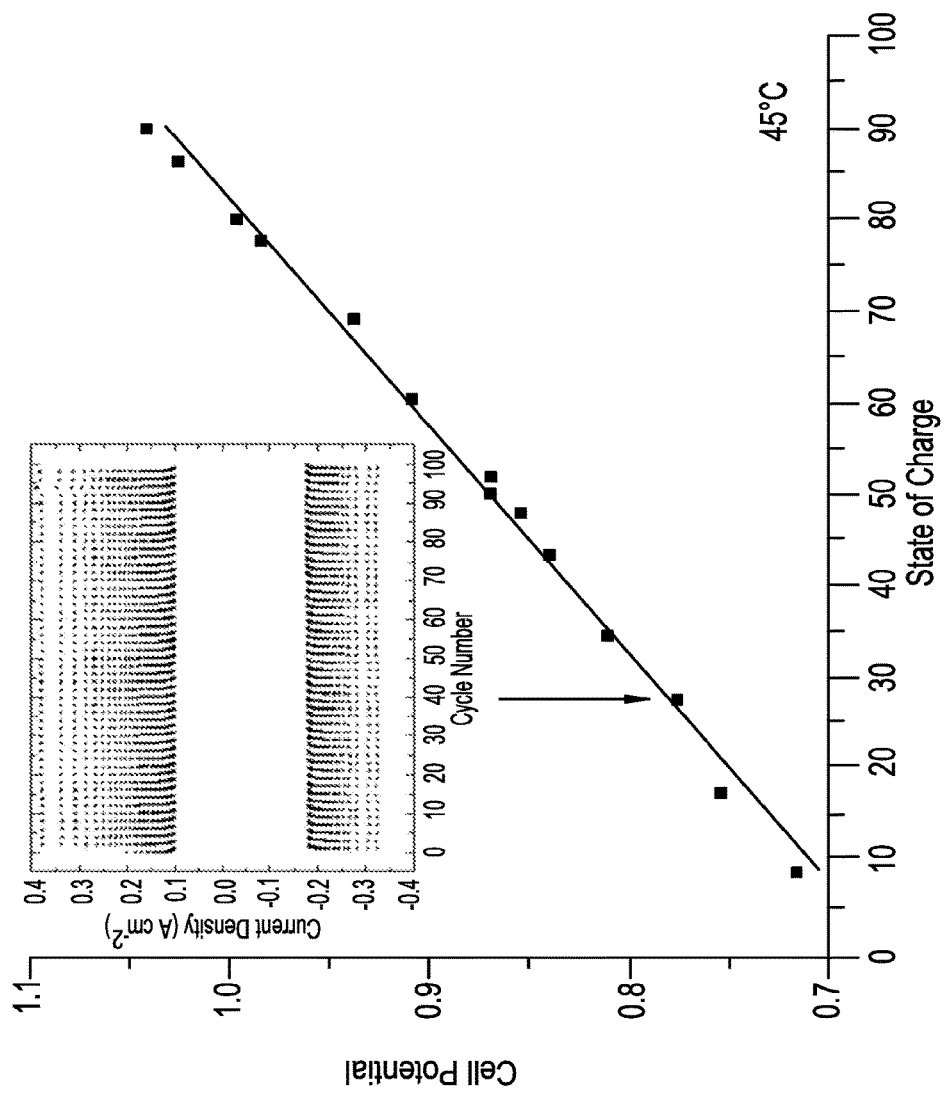
FIG. 15 is a plot of cell potential vs. state of charge for Example 9; inset shows stable current cycling over 100 shallow cycles.

M HBr and 0.9375 M NaHSO$_4$ were used as the electrolyte solution. On the negative side, 0.75 M 2,7-AQDS disodium salt in 1 M H$_2$SO$_4$ were used. These concentrations were used so that, at a 50% state of charge, no pH or total ion concentration gradients exist across the membrane. Measurements shown here were done at 50° C. A Masterflex® peristaltic pump was used to circulate the fluids. A CHInstruments 1100C potentiostat was used to measure electrochemical properties of the battery. A potential of 1.5 volts was applied to charge the cell. The potential-current response (FIG. 14A), potential-power (FIG. 14B), and open circuit potential (FIG. 15) for various states of charge (SOCs) were measured. As the SOC increased from 20% to 90%, the open circuit potential increased linearly from 0.76 V at 0.98 V. In the galvanic direction, peak power densities were 77 mW cm$^{-2}$ and 168 mW cm$^{-2}$ at these same SOCs, respectively (FIG. 14B). In order to avoid significant water splitting in the electrolytic direction, we used a cut-off voltage of 1.5 V, at which point the current densities observed at 20% and 90% SOCs were −630 mA cm$^{-2}$ and −196 mA cm$^{-2}$, respectively, with corresponding power densities of −939 mW cm$^{-2}$ and −291 mW cm$^{-2}$. As an investigation of the reproducibility and durability of the QBFB, the voltage was cycled ±0.6 V away from the open circuit potential (0.85 V @50% SOC) one hundred times for one minute each. The current density at the end of each cycle (FIG. 15, inset) was constant over the time scale of the experiment, and indicated that there were no immediate degradation, fouling, or crossover issues in the cell.

Example 10

Figure 13A:
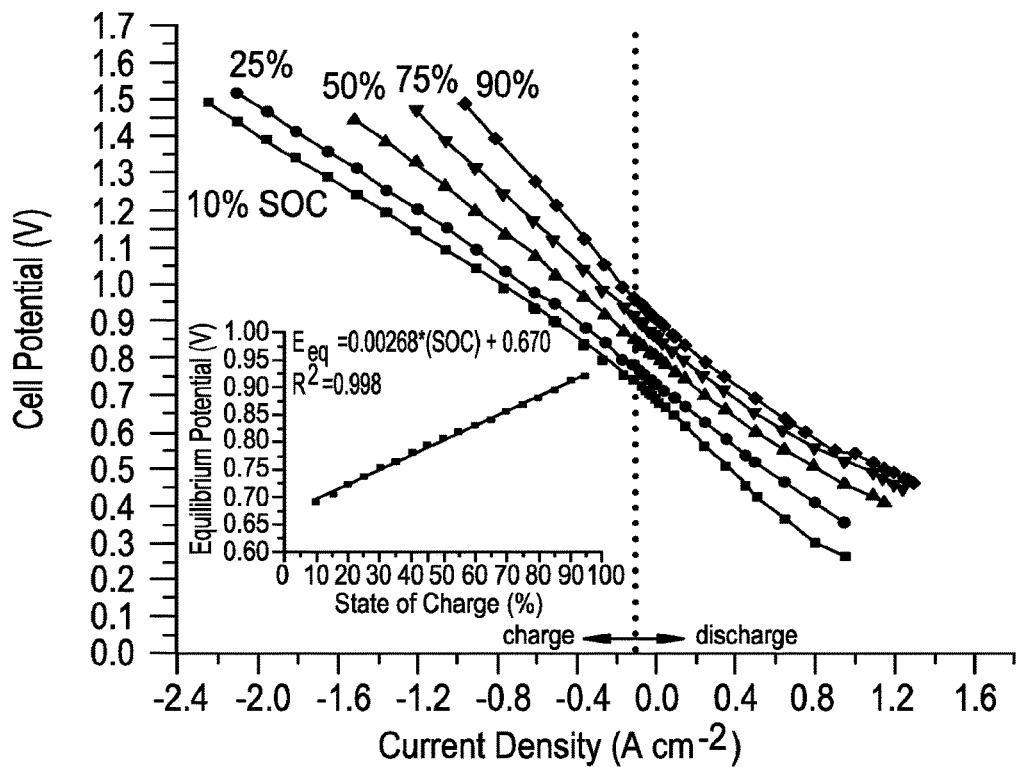
FIG. 13A is a graph of cell potential vs. current density at five different states-of-charge. The inset shows a linear increase in cell potential as the state of charge is increased.
Figure 13B:
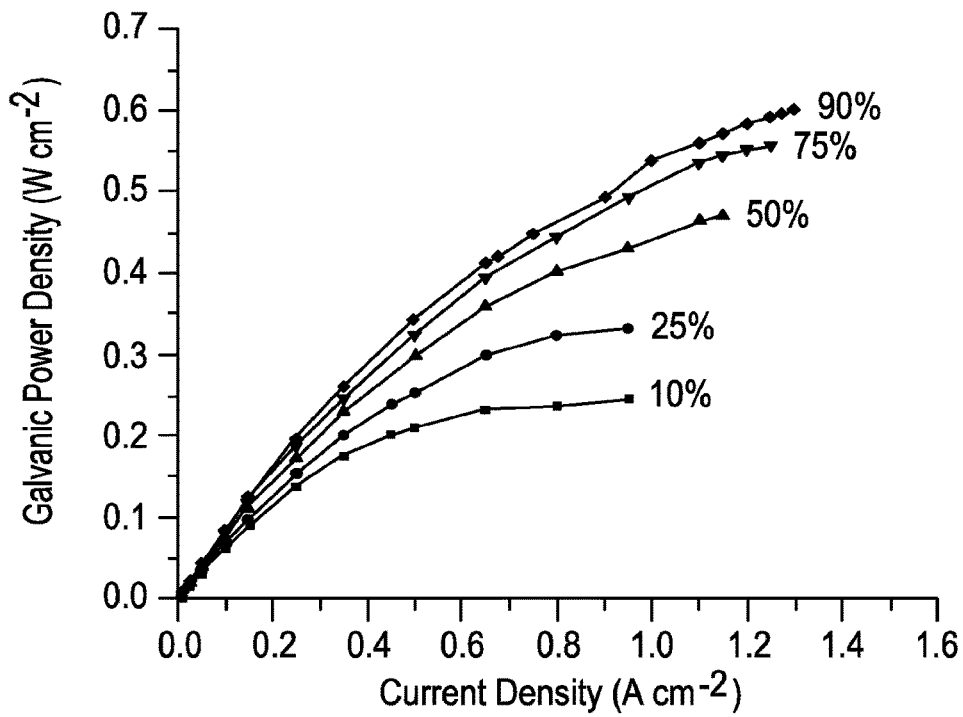
FIG. 13B is a plot of galvanic (discharge) power density vs. current density at the same five states of charge as FIG. 13A.
Figure 13C:
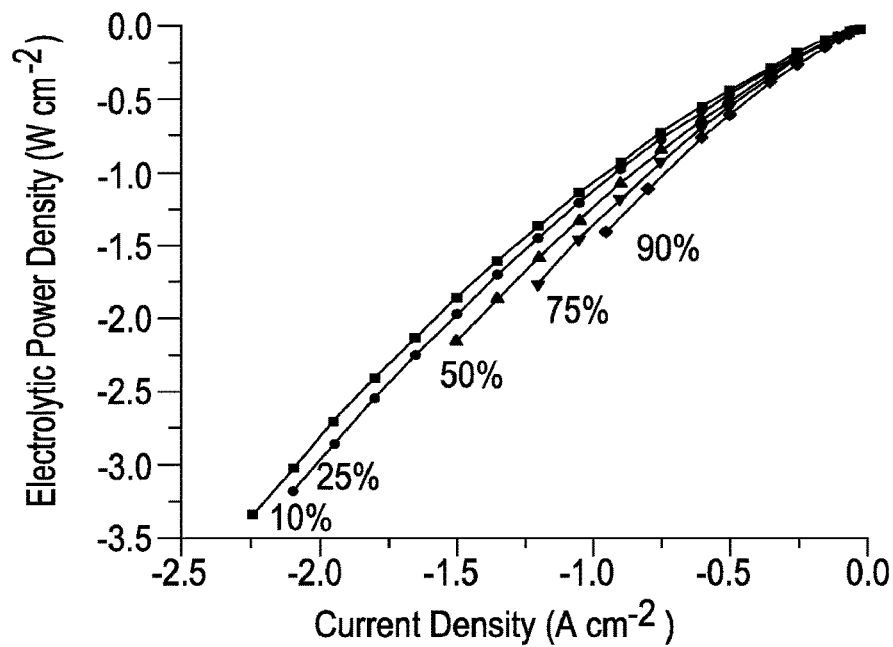
FIG. 13C is a plot of electrolytic (charging) power density vs. current density at the same five states of charge as FIG. 13A.
Figure 13D:
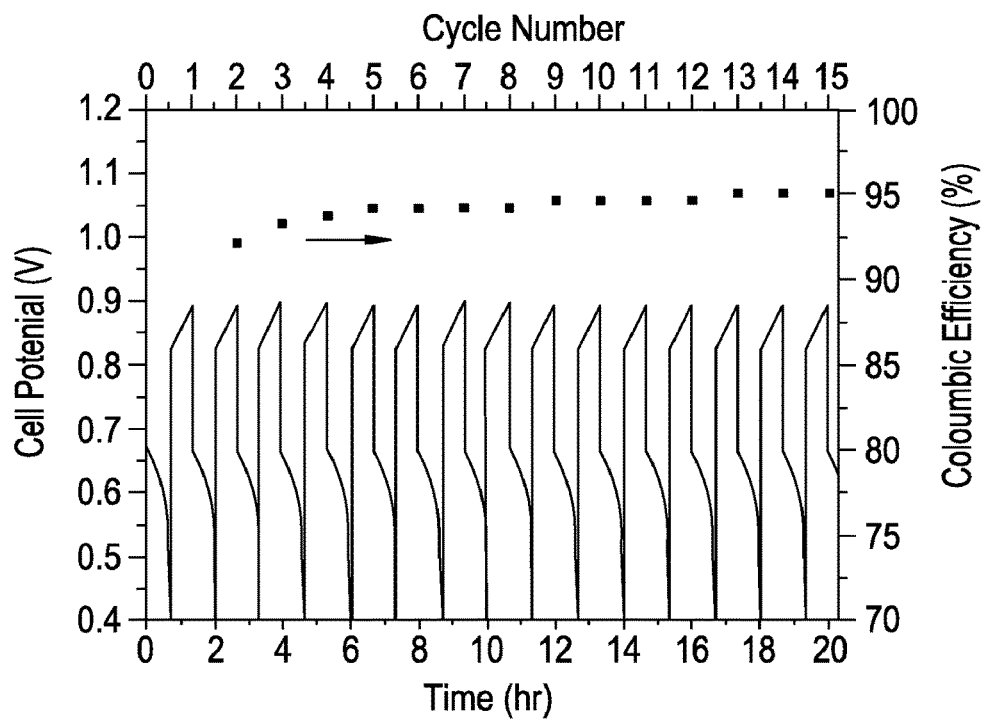
FIG. 13D is a graph of cell potential measured upon cycling at 500 mA cm$^{-2}$.

Performance characteristics of a quinone-bromine flow battery were measured under identical conditions to Example 9, except for the following: A 0.1 M solution of 9,10-anthraquinone-2,7-disulfonic acid in 1 M sulfuric acid was used for the negative electrolyte solution; 0.2 M HBr in 1 M sulfuric acid was used as the positive electrolyte solution; Interdigitated flow channels (channel width=0.0625 in., channel depth=0.08 in., landing between channels=0.031 in., Fuel Cell Technologies, Inc.) were used as current collectors; Pretreated 2 cm$^2$, stacked (6x) Toray carbon paper electrodes (each of which is about 7.5 µm uncompressed) were used on both sides of the cell—pretreatment consisted of a 10 minute sonication in isopropyl alcohol followed by a five hour soak in a hot (50° C.) mixture of undiluted sulfuric and nitric acids in a 3:1 volumetric ratio. Constant-current cycling data were collected at 0.2 A cm$^{-2}$. The cycles were highly reproducible and indicate that columbic efficiencies for the battery were, at a minimum, around 95% (FIG. 13D).

Example 11

Figure 16:
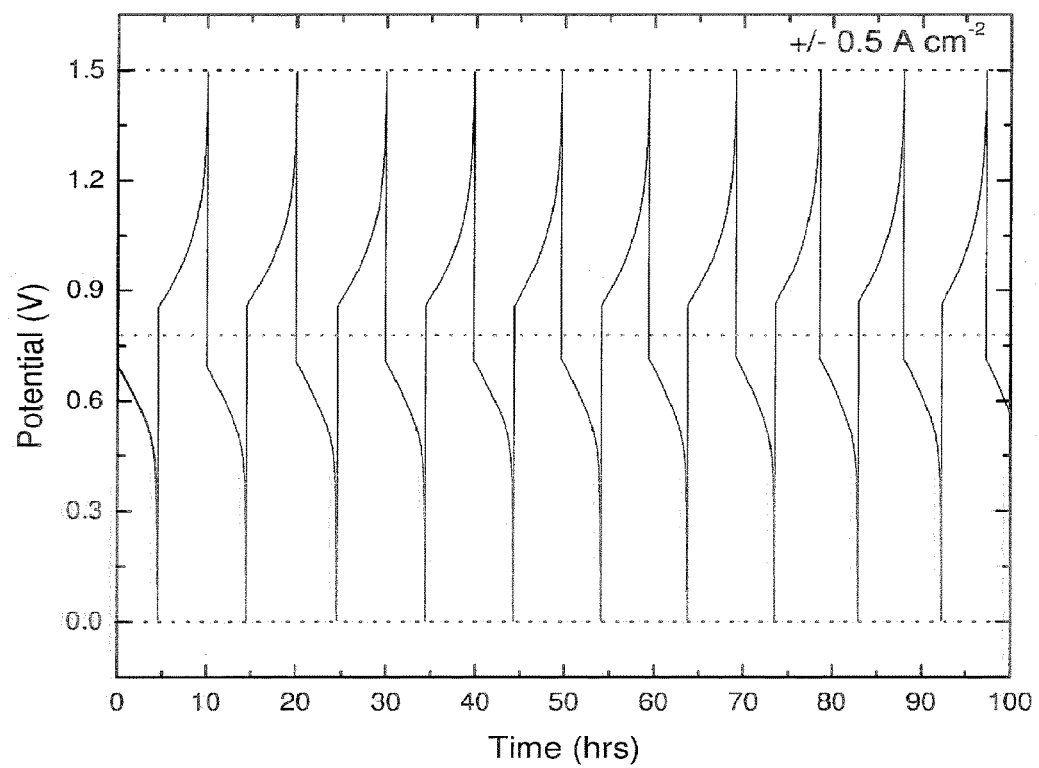
FIG. 16 is a plot of cell potential vs. time from Example 11, measured upon cycling (charge and discharge) ten times at 500 mA cm$^{-2}$.

Performance characteristics of a quinone-bromine flow battery were measured under identical conditions to Example 10, except for the following: 120 mL of 2 M HBr and 0.5 M Br$_2$ were used as the positive electrolyte solution; 1 M 2,7-AQDS in 2 M H$_2$SO$_4$ was used as the negative electrolyte solution. As the SOC increased from 10% to 90%, the open circuit potential increased linearly from 0.69 V to 0.92 V (FIG. 13A, inset). In the galvanic direction, peak power densities were 0.246 W cm$^{-2}$ and 0.600 W cm$^{-2}$ at these same SOCs, respectively (FIG. 13B). In order to avoid significant water splitting in the electrolytic direction, we used a cut-off voltage of 1.5 V, at which point the current densities observed at 10% and 90% SOCs were −2.25 A cm$^{-2}$ and −0.95 A cm$^{-2}$, respectively, with corresponding power densities of −3.342 W cm$^{-2}$ and −1.414 W cm$^{-2}$. The cell was cycled at 500 mA cm$^{-2}$, and the voltage was recorded (FIG. 16). This showed a coulombic efficiency of over 93% and no loss in charge capacity over the course of 10 cycles and 100 hours.

Example 12

Figure 17A:
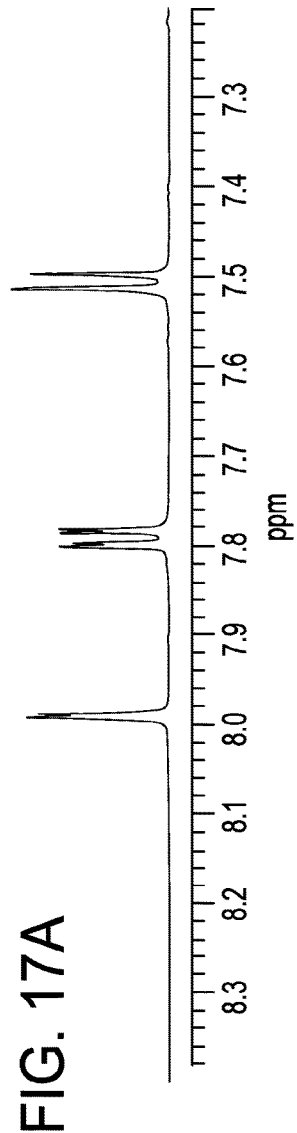
FIG. 17A is $^1$H NMR (500 MHz, D$_2$O) spectrum of AQDS. $\delta$=7.99 ppm (d, J=2 Hz, 1, 8 C—H), 7.79 (dd, J=2 and 8 Hz, 4, 5 C—H), 7.50 (d, J=8 Hz, 3, 6 C—H).
Figure 17B:
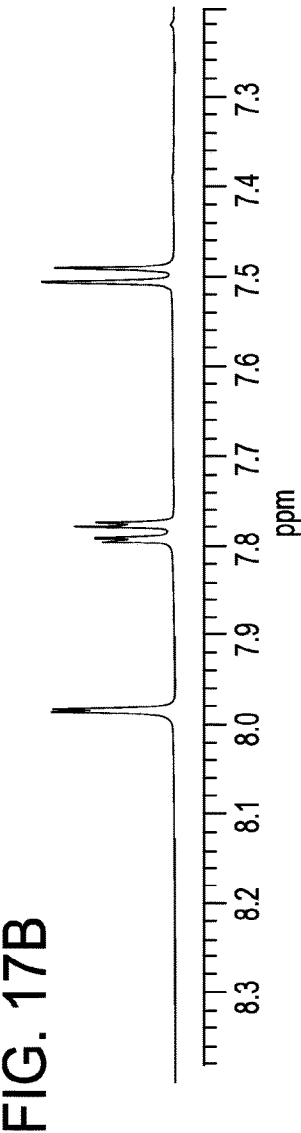
FIG. 17B is $^1$H NMR (500 MHz, D$_2$O) spectrum of the same sample, 20 h after addition of Br$_2$.
Figure 17C:
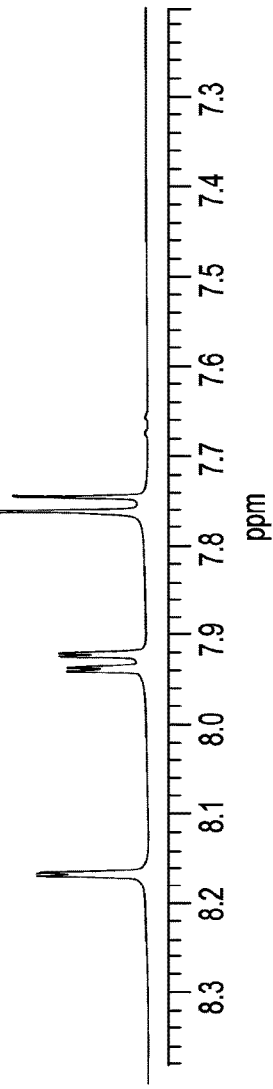
FIG. 17C is $^1$H NMR spectrum of AQDS treated with 2 M HBr and Br$_2$ and heated to 100° C. for 48 h. The peaks are shifted due to presence of trace HBr which shifted the residual solvent peak due to increased acidity. Coupling constants for each peak are identical to FIG. 17A.

50 mg of 9,10-anthraquinone-2,7-disulfonic acid was dissolved in 0.4 mL of D$_2$O was treated with 100 µL of Br$_2$. The $^1$H and $^{13}$C NMR spectra (FIGS. 17A-B and 18A-B) were unchanged from the starting material after standing for 20 hours at 25° C. 50 mg of AQDS was then treated with 1 mL of concentrated HBr and 100 µL of Br$_2$. The reaction was heated to 100° C. for 48 h and evaporated to dryness at that temperature. The resulting solid was fully dissolved in D$_2$O giving unchanged and $^1$H and $^{13}$C NMR (FIGS. 17C and 18C); however, the $^1$H NMR reference was shifted due to residual acid. 9,10-anthraquinone-2,7-disulfonic acid demonstrated no reaction with 2 M HBr and bromine when heated to 100° C. for two days (FIGS. 17A-C and 18A-C), meaning that bromine crossover will not lead to irreversible destruction of AQDS.

Example 13

1 mM solutions of the quinones listed in the following table were prepared in 1 M sulfuric acid solution. The pH of the solutions was 0. Half-cell electrochemical data were recorded using a working electrode consisting of a flat 3 mm diameter disk of glassy carbon, a coiled platinum wire as a counter electrode, and a Ag/AgCl reference electrode. Cyclic voltammograms were recorded using sweep rates of 25 mV/s. The E$^0$ was measured for each quinone by taking the average voltage value of the anodic and cathodic current density peaks and adding 0.210 V to convert form the Ag/AgCl reference to the standard hydrogen electrode (SHE).

| Entry | Name | Diagram | Standard Reduction Potential E$^0$ in Volts vs. the standard hydrogen electrode (SHE) |
|---|---|---|---|
| 1 | 9,10-anthraquinone-2,7-disulfonic acid | 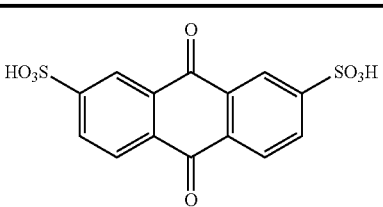 | 0.213 |

-continued

| Entry | Name | Diagram | Standard Reduction Potential $E^0$ in Volts vs. the standard hydrogen electrode (SHE) |
|---|---|---|---|
| 2 | 9,10-anthraquinone-2,6-disulfonic acid | | 0.212 |
| 3 | 9,10-anthraquinone-1,8-disulfonic acid | | 0.182 |
| 4 | 9,10-anthraquinone-1,5-disulfonic acid | | 0.223 |
| 5 | 9,10-anthraquinone-2-sulfonic acid | | 0.171 |
| 6 | 9,10-anthraquinone-2,3-dimethanesulfonic acid | | 0.114 |
| 7 | 1,8-dihydroxy-9,10-anthraquinone-2,7-disulfonic acid | | 0.118 |
| 8 | 1,5-dihydroxy-9,10-anthraquinone-2,6-disulfonic acid | | 0.116 |

-continued

| Entry | Name | Diagram | Standard Reduction Potential $E^0$ in Volts vs. the standard hydrogen electrode (SHE) |
|---|---|---|---|
| 9 | 1,4-dihydroxy-9,10-anthraquinone-2-sulfonic | | 0.094 |
| 10 | 1,3,4-trihydroxy-9,10-anthraquinone-2-sulfonic acid | | 0.088 |
| 11 | 1,2-naphthoquinone-4-sulfonic acid | | 0.423 |
| 12 | 1,4-naphthoquinone-2-sulfonic acid | | 0.356 |
| 13 | 2-chloro-1,4-naphthoquinone-3-sulfonic acid | | 0.368 |
| 14 | 2-bromo-1,4-naphthoquinone-3-acid sulfonic | | 0.371 |

CITATIONS

1 T. Nguyen and R. F. Savinell, *Electrochem. Soc. Int* 19, 54 (2010).

2 J. S. Rugolo and M. J. Aziz, *Energy & Env. Sci.* 5, 7151 (2012).

3 B. Dunn, H. Kamath, and J. M. Tarascon, *Science* 334, 928 (2011).

4 "Mineral Commodity Summaries," (U.S. Geological Survey, Reston, Va., 2012), p. 178.

5 D. Aaron, Q. Liu, Z. Tang, G. Grim, A. Papandrew, A. Turhan, T. Zawodzinski, and M. Mench, *J. Power Sources* 206, 450 (2012).

6 V. Livshits, A. Ulus, and E. Peled, *Electrochem. Comm.* 8, 1358 (2006).

7 T. V. Nguyen, H. Kreutzer, E. McFarland, N. Singh, H. Metiu, A. Ivanovskaya, and R.-F. Liu, *ECS Meeting Abstracts* 1201, 367 (2012).

8 S. Haussener, K. T. Cho, V. S. Battaglia, V. Srinivasan, and A. Z. Weber, *ECS Meeting Abstracts* 1201, 372 (2012).

9 B. T. Huskinson, J. S. Rugolo, S. K. Mondal, and M. J. Aziz, *Energy & Env. Sci.*, in press, http[://]arxiv.org/abs/1206.2883v1 (2012); *Energy & Environmental Science* 5, 8690 (2012)
10 X. Q. Zhu and C. H. Wang, *J. Org Chem.* 75, 5037 (2010).
11 M. R. Hadjmohammadi, K. Kamel, and P. Biparva, *J. Solution Chem.* 40, 224 (2011).
12 H. Akutsu, J. Yamada, S. Nakatsuji, and S. S. Turner, *Cryst. Eng. Comm.* 11, 2588 (2009).
13 E. Laviron, *J. Electroanal. Chem. and Interf. Electrochem.* 164, 213 (1984).
14 S. Narayanan, B. Haines, J. Soler, and T. Valdez, *J. Electrochem. Soc.* 158, A167 (2011).
15 N. R. de Tacconi, W. Chanmanee, B. H. Dennis, F. M. MacDonnell, D. J. Boston, and K. Rajeshwar, *Electrochem. Solid-State Lett.* 15, B5 (2012).
16 C. W. Li and M. W. Kannan, *J. Am. Chem. Soc.* 134, 7231 (2012).
17 B. Loges, A. Boddien, H. Junge, and M. Beller, *Angewandte Chemie Int. Ed.* 47, 3962 (2008).
18 J. F. Hull, Y. Himeda, W. H. Wang, B. Hashiguchi, R. Periana, D. J. Szalda, J. T. Muckerman, and E. Fujita, *Nat. Chem.* 4, 383 (2012).
19 S. Ha, R. Larsen, Y. Zhu, and R. Masel, *Fuel Cells* 4, 337 (2004).
20 C. Rice, S. Ha, R. Masel, and A. Wieckowski, *J. Power Sources* 115, 229 (2003).
21 X. Yu and P. G. Pickup, *J. Power Sources* 182, 124 (2008).
22 S. G. Bratsch, *J. Phys. Chem. Ref. Data* 18, 1 (1989).
23 N. G. Connelly and W. E. Geiger, *Chem. Rev.* 96, 877 (1996).
24 P. Wardman, *J. Phys. Chem. Ref. Data* 18, 1637 (1989).
25 F. Müh, C. Glöckner, J. Hellmich, and A. Zouni, *Biochimica et Biophysica Acta* 1817, 44 (2012).
26 Y. Xu, Y. Wen, J. Cheng, Y. Yanga, Z. Xie, and G. Cao, "Novel Organic Redox Flow Batteries Using Soluble Quinonoid Compounds as Positive Materials," in *World Non-Grid-Connected Wind Power and Energy Conference* (Nanjing, China, 2009), pp. 1.
27 M. Thomassen, B. Borresen, G. Hagen, and R. Tunold, *Electrochimica Acta* 50, 1157 (2005).
28 H. Nivinskas, S. Staskeviciene, J. Sarlauskas, R. L. Koder, A. F. Miller, and N. Cenas, *Arch. Biochem. Biophys.* 403, 249 (2002).
29 Y. Song and G. R. Buettner, *Free Radical Biology and Medicine* 49, 919 (2010).
30 S. K. Mondal, J. S. Rugolo, and M. J. Aziz, *Mater. Res. Soc. Symp. Proc.* 1311, GG10.9 (2010).
31 J. S. Rugolo, B. T. Huskinson, and M. J. Aziz, *J. Electrochem. Soc.* 159, B133 (2012).
32 M. Litt, S. Granados-Focil, and J. Kang, "Rigid Rod Polyelectrolytes with Frozen-in Free Volume: High Conductivity at Low Rh," in *Fuel Cell Chemistry and Operation*, edited by A. Herring, T. A. Zawodzinski Jr. and S. J. Hamrock (American Chemical Society, Washington, D.C., 2010), p. 49.
33 W. L. Harrison, M. A. Hickner, Y. S. Kim, and J. E. McGrath, *Fuel Cells* 5, 201 (2005).
34 X. Yu, A. Roy, S. Dunn, A. S. Badami, J. Yang, A. S. Good, and J. E. McGrath, *J. Polymer Sci. A: Polymer Chem.* 47, 1038 (2009).
35 T. Wada, A. D. Setyawan, K. Yubuta, and H. Kato, *Scripta Materialia* 65, 532 (2011).
36 J. D. Erlebacher, M. J. Aziz, A. Karma, N. Dmitrov, and K. Sieradzki, *Nature* 410, 450 (2001).
37 Crossley, M. L. The Separation of Mono-β, 2,6- and 2,7-Sulfonic Acids of Anthraquinone. *J. Am. Chem. Soc.* 37, 2178-2181 (1915).
38 Kelsall, G. H. & Thompson, I. Redox chemistry of $H_2S$ oxidation by the British Gas Stretford Process Part III: Electrochemical behaviour of anthraquinone 2,7 disulphonate in alkaline electrolytes. *J. Appl Electrochem.* 23, 296-307 (1993).
39 Forster, R. J. & O'Kelly, J. P. Protonation reactions of anthraquinone-2,7-disulphonic acid in solution and within monolayers. *J. Electroanal. Chem.* 498, 127-135 (2001).
40 Weber, A. Z. et al. Redox flow batteries: a review. *J. Appl. Electrochem.* 41, 1137-1164 (2011).

The invention claimed is:

1. A rechargeable battery comprising first and second electrodes, wherein in its charged state, the battery comprises a redox active species in contact with the first electrode, wherein the redox active species is not a quinone, and a hydroquinone in aqueous solution or aqueous suspension in contact with the second electrode, wherein during discharging the redox active species is reduced and the hydroquinone is oxidized to a corresponding quinone, wherein during charging electrical energy is stored chemically by oxidation of the redox active species at the first electrode and by reduction of the corresponding quinone to the hydroquinone at the second electrode, and wherein the battery is a flow battery.

2. The rechargeable battery of claim 1, wherein the redox active species is in aqueous solution or aqueous suspension.

3. The rechargeable battery of claim 1, wherein the redox active species in contact with the first electrode comprises chlorine, bromine, vanadium, iron, or lead.

4. The rechargeable battery of claim 1, wherein the redox active species in contact with the first electrode comprises bromine.

5. The rechargeable battery of claim 1, wherein the corresponding quinone is a water-soluble anthraquinone.

6. The rechargeable battery of claim 5, wherein the water-soluble anthraquinone comprises one or more sulfonate groups.

7. The rechargeable battery of claim 5, wherein the anthraquinone is 9,10-anthraquinone-2,7-disulfonate.

8. The rechargeable battery of claim 1, wherein first and second electrodes are separated by an ion conducting barrier, and the redox active species comprises bromine.

9. The rechargeable battery of claim 1, wherein the first electrode is separated from the second electrode by a barrier that inhibits the passage of the redox-active species and the hydroquinone.

10. The rechargeable battery of claim 1, wherein the corresponding quinone is of formula (I)-(II):

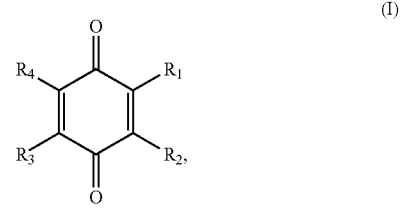

-continued

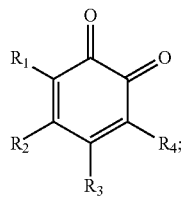

wherein each of $R_1$-$R_4$ is independently selected from H, $C_{1-6}$ alkyl, halo, $C_{1-6}$ alkoxy, and $SO_3H$, or an ion thereof.

11. The rechargeable battery of claim 10, wherein for (I) and (II) at least one of $R_1$-$R_4$ is not H.

12. The rechargeable battery of claim 1, wherein the corresponding quinone is of one of the following formulas:

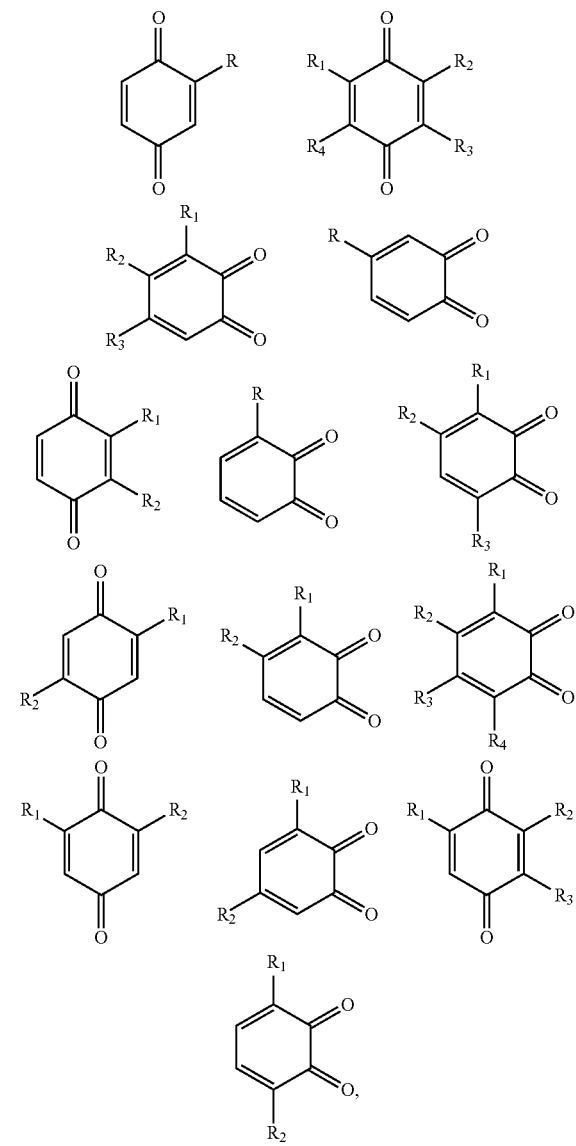

wherein each of R and $R_1$-$R_4$ is independently selected from H, $C_{1-6}$ alkyl, halo, $C_{1-6}$ alkoxy, and $SO_3H$, or an ion thereof.

13. The rechargeable battery of claim 1, further comprising a reservoir for the hydroquinone in aqueous solution or aqueous suspension and a mechanism to circulate the hydroquinone.

14. The rechargeable battery of claim 1, wherein the corresponding quinone is of formula (III):

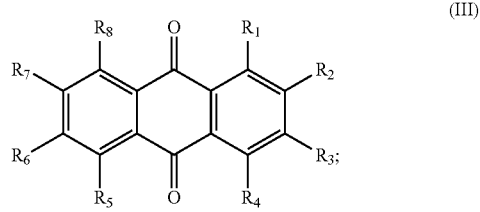

wherein each of $R_1$-$R_8$ is independently selected from H, $C_{1-6}$ alkyl, halo, $C_{1-6}$ alkoxy, and $SO_3H$, or an ion thereof.

15. The rechargeable battery of claim 14, wherein at least one of $R_1$-$R_8$ is not H.

16. The rechargeable battery of claim 14, wherein the corresponding quinone is of one of the following formulas:

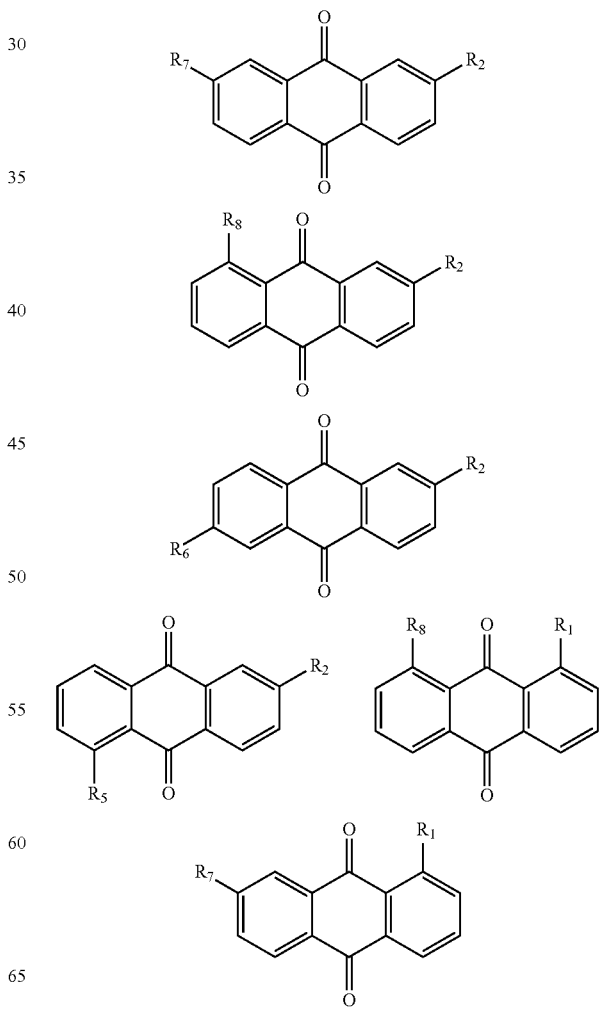

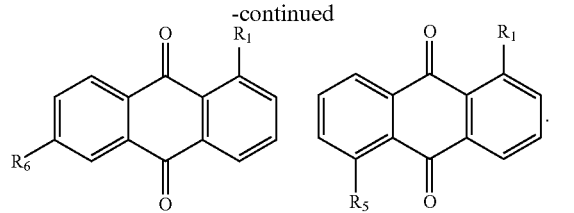
* * * * *